US011267979B2

(12) United States Patent
Stoddart et al.

(10) Patent No.: US 11,267,979 B2
(45) Date of Patent: Mar. 8, 2022

(54) SUPRAMOLECULAR ENCRYPTED FLUORESCENT SECURITY INK COMPOSITIONS

(71) Applicants: Northwestern University, Evanston, IL (US); Innotune LLC, Winter Park, FL (US)

(72) Inventors: James Fraser Stoddart, Evanston, IL (US); Xisen Hou, Skokie, IL (US); Chenfeng Ke, Skokie, IL (US); Roger B. Pettman, Winter Park, FL (US)

(73) Assignees: Northwestern University, Evanston, IL (US); Innotune LLC, Winter Park, FL (US)

( * ) Notice: Subject to any disclaimer, the term of this patent is extended or adjusted under 35 U.S.C. 154(b) by 384 days.

(21) Appl. No.: 16/269,311

(22) Filed: Feb. 6, 2019

(65) Prior Publication Data
US 2019/0169456 A1     Jun. 6, 2019

Related U.S. Application Data

(63) Continuation of application No. 14/867,953, filed on Sep. 28, 2015, now abandoned, and a continuation-in-part of application No. 14/867,826, filed on Sep. 28, 2015, now abandoned.
(Continued)

(51) Int. Cl.
*C09D 11/50* (2014.01)
(52) U.S. Cl.
CPC .................. *C09D 11/50* (2013.01)
(58) Field of Classification Search
CPC .................. C09D 11/00; C09D 11/50
See application file for complete search history.

(56) References Cited

U.S. PATENT DOCUMENTS

| 5,393,556 A | 2/1995 | Romano |
| 6,242,430 B1 | 6/2001 | Suzuki |
(Continued)

FOREIGN PATENT DOCUMENTS

| JP | 2014009358 | 1/2014 |
| WO | 20000077104 | 12/2000 |
(Continued)

OTHER PUBLICATIONS

Balte, A. et al., Journal of Chemical and Pharmaceutical Research, "Theoretical studies on the encapsulation of Paracetamol in the alpha, beta and gamma cyclodextrins", 2012, vol. 4, No. 5, pp. 2391-2399 (Year: 2012).
(Continued)

*Primary Examiner* — Jezia Riley
(74) *Attorney, Agent, or Firm* — Quarles & Brady LLP

(57) ABSTRACT

Fluorescent dyes, ink compositions comprising the dyes, methods and devices for printing the ink compositions, images printed using the ink compositions and methods for authenticating the printed images are provided. The fluorescent dyes are heterorotaxanes that include large macrocyclic rings around fluorophores and are capable of emitting solid-state fluorescence. When the heterorotaxanes are combined with encapsulating agents and competitive binding agents in aqueous solution, the resulting ink composition exhibits a complex, dynamic equilibrium that provides a tunable fluorescence emission spectrum with a non-linear response to the dye concentration.

9 Claims, 13 Drawing Sheets

Related U.S. Application Data

(60) Provisional application No. 62/057,059, filed on Sep. 29, 2014, provisional application No. 62/057,102, filed on Sep. 29, 2014.

(56) References Cited

U.S. PATENT DOCUMENTS

| | | |
|---|---|---|
| 6,312,123 B1 | 11/2001 | Codos |
| 6,764,540 B2 | 7/2004 | Taguchi |
| 7,682,523 B2 | 3/2010 | Weisman |
| 8,901,517 B2 | 12/2014 | Iftime |
| 2004/0233456 A1 | 11/2004 | Coyle |
| 2016/0137864 A1 | 5/2016 | Stoddart |

FOREIGN PATENT DOCUMENTS

| | | |
|---|---|---|
| WO | 2011059457 | 5/2011 |
| WO | 2012168151 | 12/2012 |

OTHER PUBLICATIONS

Basuray, A., Dissertation: "Diazaperopyrenium Dications: Pioneering a Class of Perylene Derivatives and their use in Mechanically Interlocked Molecules and Applications", Mar. 2013, pp. 1-138.

Brovelli et al., Emission Color Trajectory and White Electroluminescence Through Supramolecular Control of Energy Transfer and Exciplex Formation in Binary Blends of Conjugated Polyrotaxanes, Advanced Functional Materials, 22, 2012, pp. 4284-4291.

Cacialli et al., Cyclodextrin-threaded conjugated polyrotaxanes as insulated molecular wires with reduced interstrand interactions, Nature Materials, 1, 2002, pp. 160-164.

Hou et al., Efficient syntheses of pillar[6]arene-based hetero[4]rotaxanes using a cooperative capture strategy, Chem. Commun., 50, Mar. 4, 2014, pp. 6196-6199.

Hou et al., Tunable solid-state fluorescent materials for supramolecular encryption, Nature Communications 6, Article No. 6884; doi:10.1038/ncomms7884, Apr. 22, 2015.

International Search Report and Written Opinion mailed in PCT/US15/52670, dated Jan. 4, 2016.

International Search Report and Written Opinion mailed in PCT/US2015/052694, dated Jul. 25, 2016.

Ke et al., Pillar[5]arene as a Co-Factor in Templating Rotaxane Formation, J. Am. Chem. Soc., 135, Sep. 23, 2013, pp. 17019-17030.

Ke et al., Quantitative Emergence of Hetero[4]rotaxanes by Template-Directed Click Chemistry, Angew. Chem. Int. Ed., 52, Sep. 13, 2012, pp. 381-387.

Kishimura et al., Rewritable phosphorescent paper by the control of competing kinetic and thermodynamic self-assembling events, Nature Materials, 4, 2005, pp. 546-549.

Li et al., Energy Transfer Switching in a Bistable Molecular Machine, Organic Letters, vol. 7, No. 22, Sep. 24, 2005, pp. 4835-4838.

Ogoshi et al., Forster resonance energy transfer by formation of a mechanically interlocked [2]rotaxane, ChemComm, vol. 49, Apr. 24, 2013, pp. 5468-5470.

Spence et al., Near-Infared Croconaine Rotaxanes and Doped Nanoparticles for Enhanced Aqueous Photothermal Heating, Chem. Eur. J., vol. 20, Aug. 21, 2014, pp. 12628-12635.

FIG. 4B

SUPRAMOLECULAR ENCRYPTED FLUORESCENT SECURITY INK COMPOSITIONS

CROSS-REFERENCE TO RELATED APPLICATIONS

The present application is a continuation of U.S. patent application Ser. No. 14/867,953, filed Sep. 28, 2015, which claims priority to U.S. Provisional Patent Application No. 62/057,102 that was filed Sep. 29, 2014, and a continuation in part of U.S. patent application Ser. No. 14/867,826, filed Sep. 28, 2015, which claims priority to U.S. Provisional Patent Application No. 62/057,059, filed Sep. 29, 2014, all of which are hereby incorporated by reference in their entirety.

BACKGROUND

The global economic and social impacts of counterfeiting result in the loss of 600 billion US Dollars annually (1). The practice infringes on intellectual property and impinges detrimentally on society, especially in the arenas of health (2), commerce, and finance (3). A variety of security technologies (4) have already been developed using innovative security printing materials (5) as crucial anti-counterfeiting measures to deter counterfeiters. Although fluorescent dyes, which can be applied easily to different surfaces inexpensively, have been implemented widely to protect high-value merchandise, government documents, and banknotes, these dyes are familiar to counterfeiters. In response, next-generation fluorescent dyes with properties such as multi-color emission (6, 7), luminescence up-conversion (8), fluorescent lifetime encoding and decoding (9), and stimulus-responsive color-tuning (10, 11) have all been suggested as ways to counteract forgery.

Important considerations, when designing fluorescent security dyes, include (i) tunable emission wavelengths, (ii) stimulus-responsive properties, (iii) susceptibility to mimicry, as well as accessibility, compatibility with current printing technologies and cost. Solid-state fluorescent dyes with tunable (9, 12) and stimulus-responsive (13-15) emission wavelengths remain challenging to design. Most of the current dyes, which exhibit stimulus-induced spectroscopic changes, are crystalline with slow response times and narrow tunable wavelength windows.

SUMMARY

Ink compositions comprising fluorescent dyes, methods and printheads for printing the ink compositions, images printed using the ink compositions and methods of authenticating the printed images are provided.

One embodiment of an ink composition comprising a fluorescent dye comprises: (a) water; and (b) a heterorotaxane. The heterorotaxane comprises: (i) a substantially linear molecule comprising a central fluorophoric group, a first fluorophoric end group on one end of the substantially linear molecule, and a second fluorophoric end group on the opposite end of the substantially linear molecule; (ii) a first macrocyclic ring encircling the central fluorophoric group; (iii) a second macrocyclic ring encircling a portion of the substantially linear molecule between the first fluorophoric end group and the central fluorophoric end group; and (iv) a third macrocyclic ring encircling a portion of the substantially linear molecule between the second fluorophoric end group and the central fluorophoric group. The ink composition also, optionally, includes: (c) an encapsulating agent comprising a macrocyclic ring that is capable of encapsulating one or both of the first and second fluorophoric end groups; and (d) a competitive binding agent that competes with one or both of the first and second fluorophoric end groups for binding the encapsulating agent.

One embodiment of a printhead comprises: a plurality of different ink channels, the different ink channels containing fluorescent ink compositions that comprise: (a) water; and (b) a heterorotaxane. The heterorotaxane comprises: (i) a substantially linear molecule comprising a central fluorophoric group, a first fluorophoric end group on one end of the substantially linear molecule, and a second fluorophoric end group on the opposite end of the substantially linear molecule; (ii) a first macrocyclic ring encircling the central fluorophoric group; (iii) a second macrocyclic ring encircling a portion of the substantially linear molecule between the first fluorophoric end group and the central fluorophoric group; and (iv) a third macrocyclic ring encircling a portion of the substantially linear molecule between the second fluorophoric end group and the central fluorophoric group. The ink composition also, optionally, includes: (c) an encapsulating agent comprising a macrocyclic ring that is capable of encapsulating one or both of the first and second fluorophoric end groups; and (d) a competitive binding agent that competes with one or both of the first and second fluorophoric end groups for binding the encapsulating agent. By filling different ink channels with different formulations of the fluorescent ink compositions, the printhead can be configured to print polychromic images.

One embodiment of a method for printing an image on a substrate comprises applying one or more fluorescent ink compositions onto a surface of the substrate and allowing the one or more applied fluorescent ink composition to dry, wherein the fluorescent ink compositions comprise: (a) water; and (b) a heterorotaxane. The heterorotaxane comprises: (i) a substantially linear molecule comprising a central fluorophoric group, a first fluorophoric end group on one end of the substantially linear molecule, and a second fluorophoric end group on the opposite end of the substantially linear molecule; (ii) a first macrocyclic ring encircling the central fluorophoric group; (iii) a second macrocyclic ring encircling a portion of the substantially linear molecule between the first fluorophoric end group and the central fluorophoric group; and (iv) a third macrocyclic ring encircling a portion of the substantially linear molecule between the second fluorophoric end group and the central fluorophoric group. The ink composition also, optionally, includes: (c) an encapsulating agent comprising a macrocyclic ring that is capable of encapsulating one or both of the first and second fluorophoric end groups; and (d) a competitive binding agent that competes with one or both of the first and second fluorophoric end groups for binding the encapsulating agent. Polychromic images can be printed by applying different formulations of the fluorescent ink compositions onto the surface of the substrate.

One embodiment of a printed substrate comprises: a substrate; and one or more fluorescent inks that form an image on the surface of the substrate, the fluorescent inks comprising: a heterorotaxane comprising: (i) a substantially linear molecule comprising a central fluorophoric group, a first fluorophoric end group on one end of the substantially linear molecule, and a second fluorophoric end group on the opposite end of the substantially linear molecule; (ii) a first macrocyclic ring encircling the central fluorophoric group; (iii) a second macrocyclic ring encircling a portion of the substantially linear molecule between the first fluorophoric end group and the central fluorophoric group; and (iv) a third macrocyclic ring encircling a portion of the substantially linear molecule between the second fluorophoric end group and the central fluorophoric group. The ink also, optionally, includes an encapsulating agent comprising a macrocyclic ring that is capable of encapsulating one or both of the first and second fluorophoric end groups; and a competitive binding agent that competes with one or both of the first and second fluorophoric end groups for binding the encapsulating agent. Some embodiments of the printed substrates comprise polychromic images comprising a plurality of different fluorescent inks.

The polychromic images can be authenticated by: applying an authentication reagent over the polychromic image, wherein the authentication reagent induces a change in the fluorescence emission spectrum of the polychromic image; and comparing the change in the fluorescence emission spectrum of the polychromic image against a known fluorescence emission spectrum change for an authentic printed substrate.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 1A. Synthesis of the heterorotaxane R4.4Cl from the stopper 1.Cl, the dumbbell precursor 2.2Cl, CB6 and γ-CD. FIG. 1B. Graphical representation of the aggregation of $R4^{4+}$ monomers in response to changes in concentration or temperature. FIG. 1C. UV/Vis absorption (solid lines) and normalized fluorescence spectra (excitation: dashed lines, emission: dotted lines) of aqueous solutions of R4.4Cl, stopper 1.Cl and dumbbell precursor 2.2Cl. FIG. 1D. Concentration dependent (25-500 μM) UV/Vis absorption spectra of R4.4Cl at 25° C. in water. FIG. 1E. Normalized concentration dependent (25-500 μM) fluorescence emission spectra ($\lambda_{excitation}$=341 nm) of R4.4Cl at 25° C. in water. FIG. 1F. Temperature dependent (2-80° C.) induced circular dichroism (ICD) spectra (200 μM) of R4.4Cl in water.

FIG. 2A. Graphical representation of the equilibria involving $R4^{4+}$ in the presence of γ-CD and CAs. FIG. 2B. Solid-state fluorescence spectra ($\lambda_{excitation}$=347 nm) of R4.4Cl upon adding 0-200 equiv of γ-CD, followed by 200 equiv of Ad.Cl. FIG. 2C. Powders obtained from homogeneous mixtures of R4.4Cl and varying amounts (0-200 equiv) of γ-CD and Ad.Cl (200 equiv) under UV light.

FIG. 3A. R4 ⊂ γ-$CD_2$ ink written on different paper media (newsprint, coated and uncoated rag paper, banknotes, copy, matte, and glossy white paper) under UV light. FIG. 3B. A QR code printed using a customized black inkjet cartridge filled with $R4^{4+}$ ⊂ γ-$CD_2$ under UV light. FIG. 3C. Graphical representations of a customized tri-color inkjet cartridge, in which aqueous solutions of R4.4Cl/γ-CD (R4.4Cl: 1 mM, γ-CD: 200 mM), a CA and γ-CD occupy the yellow, magenta, and cyan color channels, respectively. FIG. 3D. Fluorescent replica of van Gogh's 'Sunflowers' on rag paper printed using the customized tri-color inkjet cartridge under UV and natural light. FIG. 3E. Digital replica of FIG. 3D. FIG. 3F. A standard color palette. FIG. 3G. Color palette image produced using the customized tri-color inkjet cartridge with Ad.Cl (200 mM) in the CA channel. FIG. 3H. Color palette image produced using the customized tri-color inkjet cartridge with AdMe.Cl (200 mM) in the CA channel. FIG. 3I. Color palette image produced using the customized tri-color inkjet cartridge with AdMe.Cl (20 mM) in the CA channel. FIG. 3J. Color palette image produced using the customized tri-color inkjet cartridge with γ-CD (20 mM) in the γ-CD channel. FIG. 3K. Color palette image produced using the customized tri-color inkjet cartridge with γ-CD (100 mM) with PyMe.Cl (4 mM), in the γ-CD channel. FIG. 3L. Fluorescent replica of Briex's 'Apostelhoeve Wine Estate Maastricht' printed using an inkjet cartridge with the same setting as FIG. 3K under UV and natural light. FIG. 3M. Digital replica of FIG. 3L.

FIGS. 4A-C. Fraud protection and detection using the security ink. FIG. 4A. Polychromic color palettes produced by the customized inkjet cartridge (center) and its derivatives (around the periphery, after printing a layer of authentication reagents) under UV light. FIG. 4B. A demonstration of fluorescent colors produced by R4-based inks with different formulations that appear almost identical (cf. 1b and 1c, or 2b and 2c), but are distinguished (cf. 1a and 1d, or 2a and 2d) using an authentication agent. No distinguishable color change is observed (line 3) using rhodamine B (RhB). FIG. 4C. A flowchart for the supramolecular encryption and chemical authentication processes.

FIG. 5A. tri-color inkjet cartridge loaded with R4.4Cl/γ-CD (2 mL, R4.4Cl: 0.25 mM, γ-CD: 10 mM), AdMe.Cl (2 mL, 50 mM), and PyMe.Cl/γ-CD (2 mL, PyMe.Cl: 1 mM, γ-CD: 25 mM), in three channels respectively.

DETAILED DESCRIPTION

Fluorescent dyes, ink compositions comprising the dyes, methods and printheads for printing the ink compositions, images printed using the ink compositions and methods for authenticating the printed images are provided.

The fluorescent dyes are heterorotaxanes that include large macrocyclic rings around fluorophores and are capable of emitting solid-state fluorescence. When the heterorotaxanes are combined with encapsulating agents and competitive binding agents in aqueous solution, the resulting ink composition exhibits a complex, dynamic equilibrium that provides a tunable fluorescence emission spectrum with a non-linear response to the dye concentration. As a result, the ink compositions are useful as security inks for printing polychromatic encrypted images that are difficult to reproduce, but relatively easy to authenticate.

The heterorotaxanes are compounds comprising a substantially linear molecule (sometimes referred to as a rod) and one or more macrocyclic rings encircling the substantially linear molecule, such that they are bound together in a threaded supramolecular structure by non-covalent forces. The substantially linear molecule comprises at least one central fluorophoric group along its length and a bulky fluorophoric end group at each end that prevent the dethreading of the macrocyclic rings. (The bulky end groups on heterorotaxanes are sometimes referred to as stoppers.) In the fluorescent dyes, the central fluorophoric group is encircled by one of the macrocyclic rings.

Figure 1A:
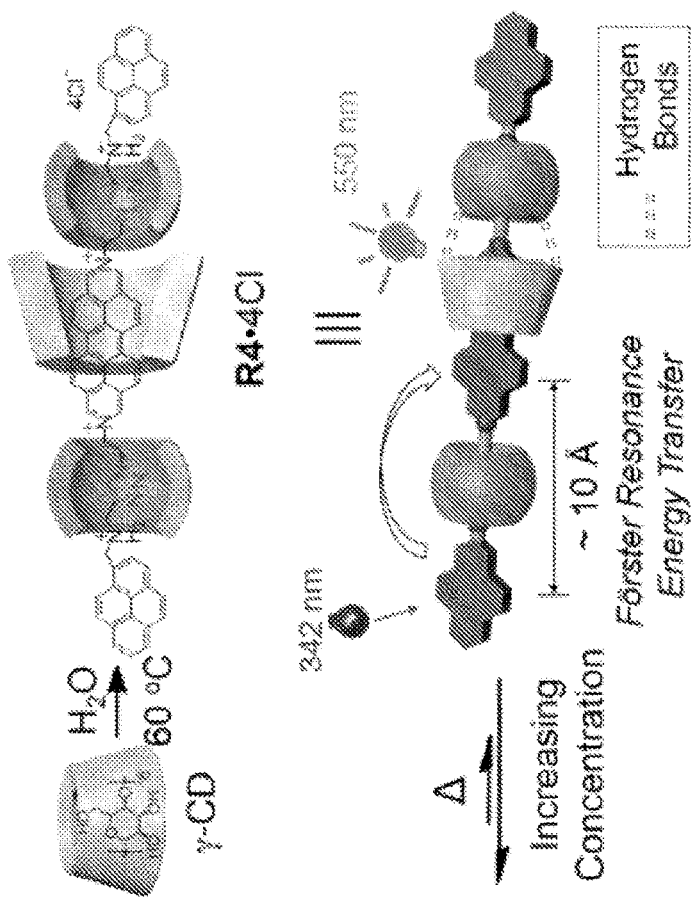
FIGS. 1A-F. Synthesis and photo-physical properties of the heterorotaxane.

One embodiment of a fluorescent dye, denoted "R4.4Cl" is shown in FIG. 1A. This dye comprises a substantially linear molecule comprising a central fluorophoric group, a first fluorophoric end group on one end of the substantially linear molecule, and a second fluorophoric end group on the opposite end of the substantially linear molecule. A first macrocyclic ring encircles the central fluorophoric group. A second macrocyclic ring encircles a portion of the substantially linear molecule between the first fluorophoric end group and the central fluorophoric group and a third macrocyclic ring encircles a portion of the substantially linear molecule between the second fluorophoric end group and the central fluorophoric group.

Examples of fluorescent dyes include those that comprises two N-(1-pyrenylmethyl)ethylammonium units and one 2,9-diethyl-2,9-diazaperopyrenium unit connected by two 1,2,3-triazole units, penetrating a cucurbit[6]uril ring, a γ-cyclodextrin, and another cucurbit[6]uril ring in sequence. Therefore, these dyes can be characterized by formula I:

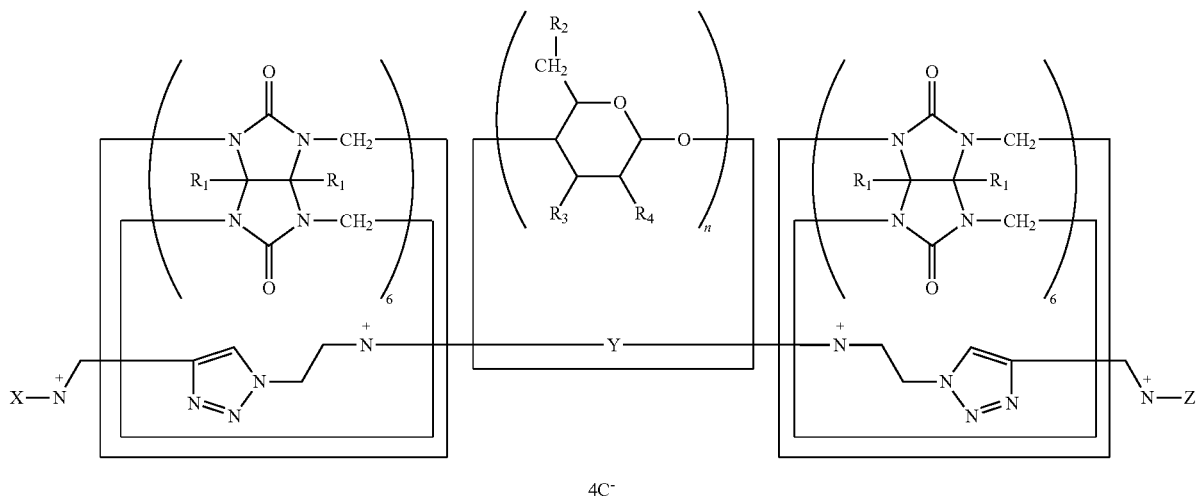

(Formula I)

where X, Y and Z are fluorophoric groups; $N^+$ is a quarternary nitrogen cation; n has a value of 6, 7 or 8; $R_1$, $R_2$, $R_3$ and $R_4$ are selected independently from the group consisting of H, alkyl groups, alkenyl groups, alkynyl groups, aryl groups, OH, $NH_2$, SH, F, Cl, Br, I, $PR'_2$, CHO, COOR', COOM, $CH_2OR'$, $CH_2OM$, OR', NHCOR', CONHR', CONHM, $CONR'_2$, $N_3$, $NO_2$, $B(OR')_2$, $B(OM)_2$, CN, $NR'^{3+}$, $PR'^{3+}$, $POR'_2$, and OM, where R' is selected independently from the group consisting of H, alkyl groups, alkenyl groups, alkynyl groups, and aryl groups and M is selected independently from the group consisting of Li, Na, K, Rb, and Cs; and $C^-$ is an organic or inorganic negatively charged ion.

The fluorophoric groups may comprise organic heterocyclic groups and/or organic aromatic groups. Specific examples of fluorophoric groups that can be incorporated into the substantially linear chain, include but are not limited to pyrene, 2,9-diethyl-2,9-diazaperopyrenium dication, anthracene, coumarin, acridine, 9-aminoacridine, fluorescein, naphthofluorescein, resofurin, rhodamine B, rhodamine 6G, perylene diimide, naphthalene diimide, pro-pidium, boron difluoride dipyrromethene, phthalocyanine, cyanine, porphyrin, and their derivatives. In some embodiments, $N^+$ is selected from the group consisting of ammonium, methyl ammonium, dimethyl ammonium and pyridinium cations. In some embodiments, $C^-$ is selected from the group consisting of $F^-$, $Cl^-$, $Br^-$, $I^-$, $PF_6^-$, $BF_4^-$, $CF_3COO^-$, $CH_3COO^-$, $SO_4^{2-}$, $SO_3^{2-}$, $NO_3^-$, $NO_2^-$, $CO_3^{2-}$, $HCO_3^-$, $ClO_4^-$, $PO_4^{3-}$, $HPO_4^{2-}$, $H_2PO_4^-$, $CN^-$, and $SCN^-$.

In one embodiment of dye having the structure represented by Formula I, X and Z are 1-pyrenylmethyl, Y is a 2,9-diazaperopyrenium dication; n is 8; all of the $R_1$ groups are H atoms, all of the $R_2$, $R_3$, and $R_4$ groups are OH groups, and $C^-$ of the rotaxane-type dyes is $Cl^-$.

A detailed description of methods for making a fluorescent dye having the structure represented by Formula I is provided in the Examples and the Appendix to this example. Briefly, one embodiment of the methods comprises reacting one or more dye molecules that comprise one or more propargyl ammonium/pyridinium groups, another one or more dyes that comprise one or more azido ethyl ammonium/pyridinium groups, cyclodextrin, and cucurbit[6]uril in water at a temperature between 0° C. and 100° C. By way of illustration, N-(1-pyrenyl methyl)-N-propargyl ammonium chloride, 2,9-bis(2-azidoethyl)-2,9-diazaperopyrenium chloride, γ-cyclodextrin, and cucurbit[6]uril can be reacted in water at 60° C. This reaction is shown in FIG. 1A.

Figure 1B:
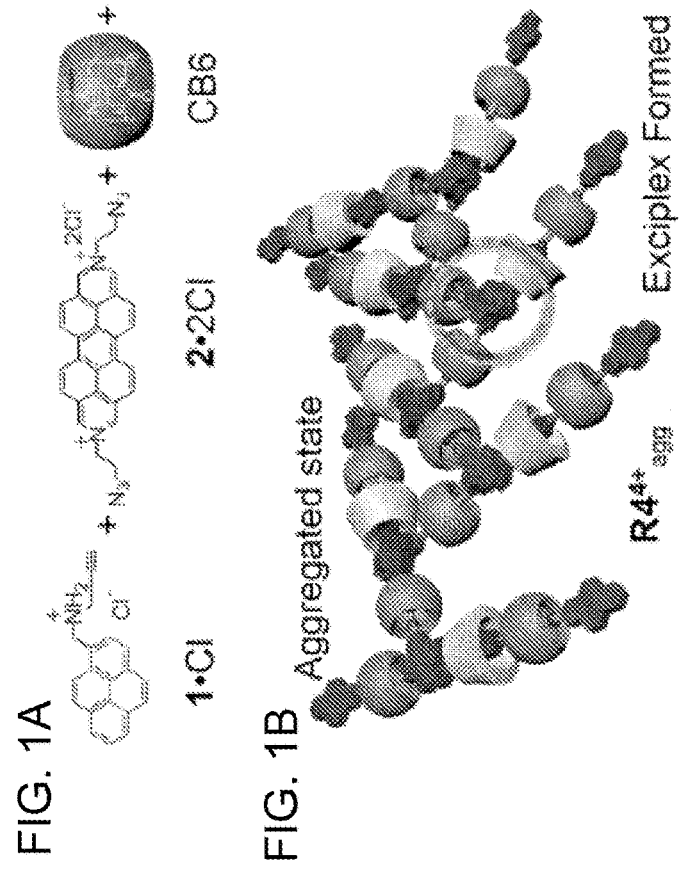
Figure 2A:
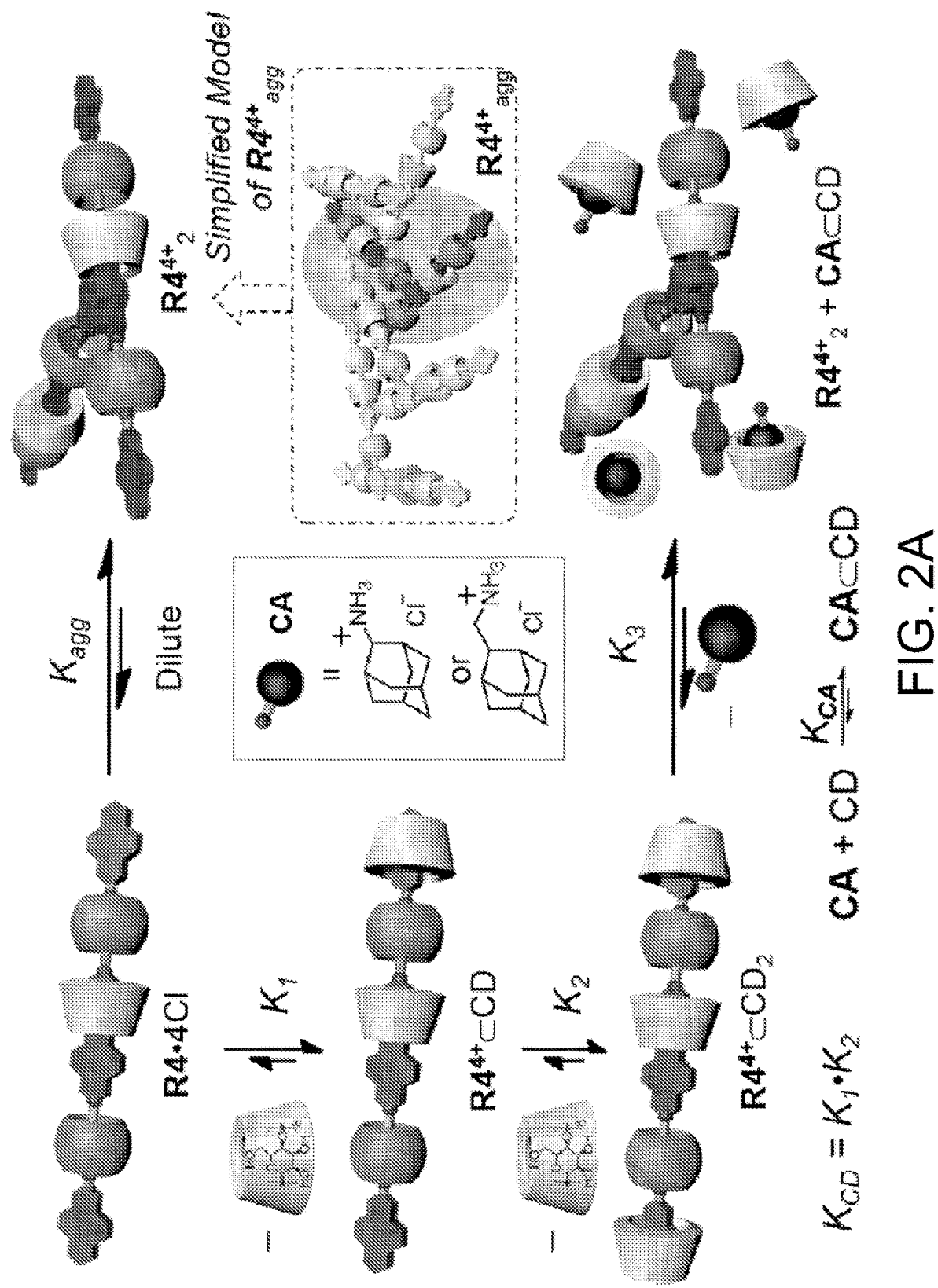
FIGS. 2A-C. Equilibrium network and solid-state fluorescence studies.

The heterorotaxane dye compounds are characterized in that they undergo aggregation in aqueous solution, the extent of which depends on their concentration in the solution, the temperature of the solution and their chemical environment. Therefore, because the fluorescence emission spectra for the dye solutions, and for inks printed from the solutions, is dependent on the extent of dye aggregation, the fluorescence emission spectra can be altered by manipulating the equilibrium between the monomeric and aggregated states of the heterorotaxane dyes. This is illustrated schematically in FIG. 1B. In the present ink compositions, this equilibrium is manipulated by the use of one or more encapsulating agents and one or more competitive binding agents in aqueous ink compositions. This is illustrated schematically in FIG. 2A.

The encapsulating agents are molecules comprising a macrocyclic ring that is capable of encapsulating one or both of the fluorophoric end groups on the substantially linear molecule of the heterorotaxane. As such, the presence of the encapsulating agents promotes the monomeric state of the fluorescent dyes. The encapsulating agents can be fluorophoric molecules or non-fluorophoric molecules. The macrocyclic ring may be, for example, the same type of macrocyclic ring that encircles the central fluorophoric group of the heterorotaxane. By way of illustration, if the central fluorophoric group of the heterorotaxane is encircled by a cyclodextrin (CD) ring, the encapsulating agent may be γ-CD. Although it is not necessary to include an encapsulating agent in the ink compositions, their inclusion makes it possible to formulate ink compositions having a wide range of fluorescent colors for printing polychromic images. This wide color range can be achieved by including the encapsulating agents even if the ink compositions all comprise the same fluorescent dye molecules.

The competitive binding agents are molecules that compete with the fluorophoric end groups for binding to the encapsulating agents. As such, the inclusion of the competitive binding agents in the ink compositions promotes the aggregated state of the fluorescent dyes. The competitive binding agents can be fluorophoric molecules or non-fluorophoric molecules. In some embodiment of the ink compositions, the competitive binding agents comprise the same fluorophoric groups as the heterorotaxane. By way of illustration, if the encapsulating agent comprises a CD ring, the competitive binding agent may be 2-adamantylamine hydrochloride. However, many other competitive binding agents can be used. The competitive binding agents need not be included in the ink compositions. However, when they are present in combination with one or more encapsulating agents, they enable the ink compositions to access an even wider range of fluorescent colors.

The fluorescence intensity of the ink compositions and inks at a given wavelength will be determined by the sum of the fluorescence emission intensities of each component in the ink composition or printed ink. Thus, at a given wavelength, the fluorescence intensity of the ink compositions and printed inks printed from the compositions will depend on the relative concentrations of the components of the ink compositions and will also depend on the association strength between the encapsulating agents and the competitive binding agents. Moreover, because the sensitivity of the fluorescence emission spectra to the concentrations of the components and their equilibrium constants is non-linear, the complex supramolecular equilibria in the aqueous ink compositions give rise to a powerful chemical encryption printing system characterized by a complex and highly varied printed color palette. As a result, multicolored fluorescent images can be produced by applying different ink compositions to the surface of a substrate and allowing the inks to dry, providing a polychromatic film of ink on the surface. The different ink compositions may differ in the relative amounts of heterorotaxane, encapsulating agent and binding agent present in solution, differ in the competitive binding agents present in solution, or differ in both respects.

The multicolored fluorescent images can be printed using an automated printing device, such as an inkjet printer, comprising a plurality of ink channels containing the different ink compositions. However, the ink composition can also be dispensed from handheld writing utensils, such as ink pens. When the ink compositions dry they form an image that appears multicolored when viewed under an ultraviolet light.

The presence of the inks in a printed image can be verified by simply viewing the image under an appropriate light source, such as a UV light source and observing the resulting fluorescence emission from the image. Further confirmation of the presence of the inks can be verified using chemical indicators. Indicators that the inks are present in a printed image include: the observation of a non-linear color change when the printed image is exposed to aqueous solutions containing different competitive binding agents; the observation of a change in the color gradient of the image or the observation of new colors in the image when a composition comprising a competitive binding agent and/or an encapsulating agent is printed over the printed image; the observation of a characteristic color change when the printed image is exposed to a fluorescence quencher; and/or the observation of a characteristic color change when the printed image is submerged in water or an aqueous solution.

Similarly, the authenticity of a printed image comprising the fluorescent inks can be verified by applying an authentication reagent over the image, wherein the authentication reagent induces a change in the fluorescence emission spectrum of the image; and comparing the change in the fluorescence emission spectrum of the image against a known fluorescence emission spectrum change for an authentic printed image. That is, the change in the emission spectrum can be compared against a known standard. The printed image being authenticated may be polychromic image. The comparison may be carried out by simply comparing a visual observation of the change in the fluorescence emission with an expected change in the fluorescence emission. Alternatively, the fluorescence emission spectrum of the image can be obtained under UV illumination before and after the application of the authentication reagent to obtain the change in the emission spectrum for the printed image. That change can then be compared with the change in the fluorescence emission spectrum for an authentic printed image, using the same authentication reagent, to see if they match.

Various embodiments of the authentication reagents operate as follows. In some embodiments the authentication reagents comprise water-soluble non-fluorescent encapsulating agents and/or non-fluorescent competitive binding agents that alter the fluorescence emission spectrum of the image. In other embodiments, the authentication reagents comprise water-soluble fluorescent dyes as competitive binding that alter the fluorescence emission spectrum of the image. In still other embodiments, the authentication reagents comprise salts that provide anions that undergo anion exchange with the anions associated with the heterorotaxane in the fluorescent inks to alter the fluorescence emission spectrum of the image. In yet other embodiments, the authentication reagent comprises water, which washes away water-soluble encapsulation agents and/or water soluble competitive binding agents in the fluorescent inks to alter the fluorescence emission spectrum of the image.

Figure 4A:
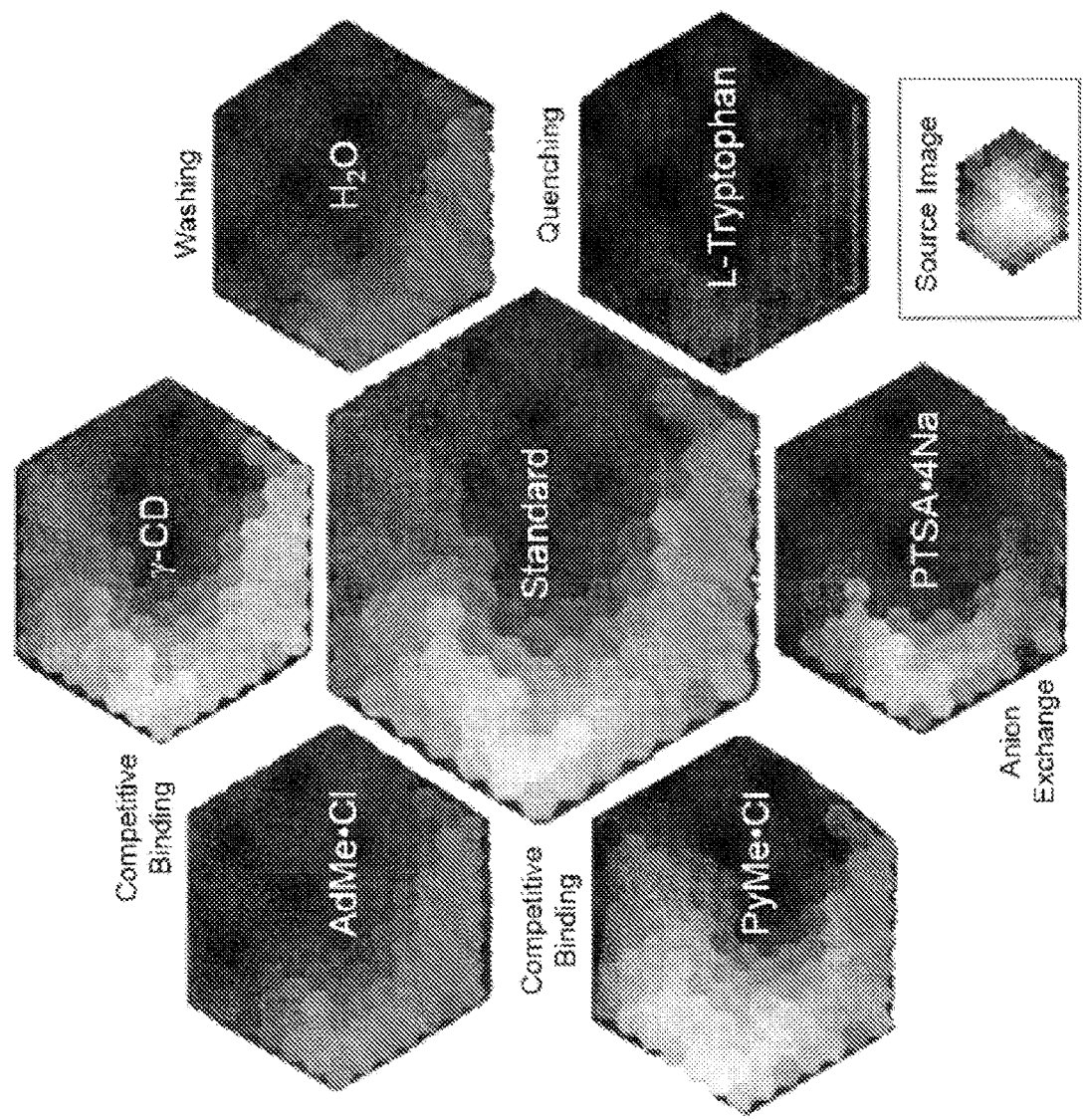
Figure 4B:
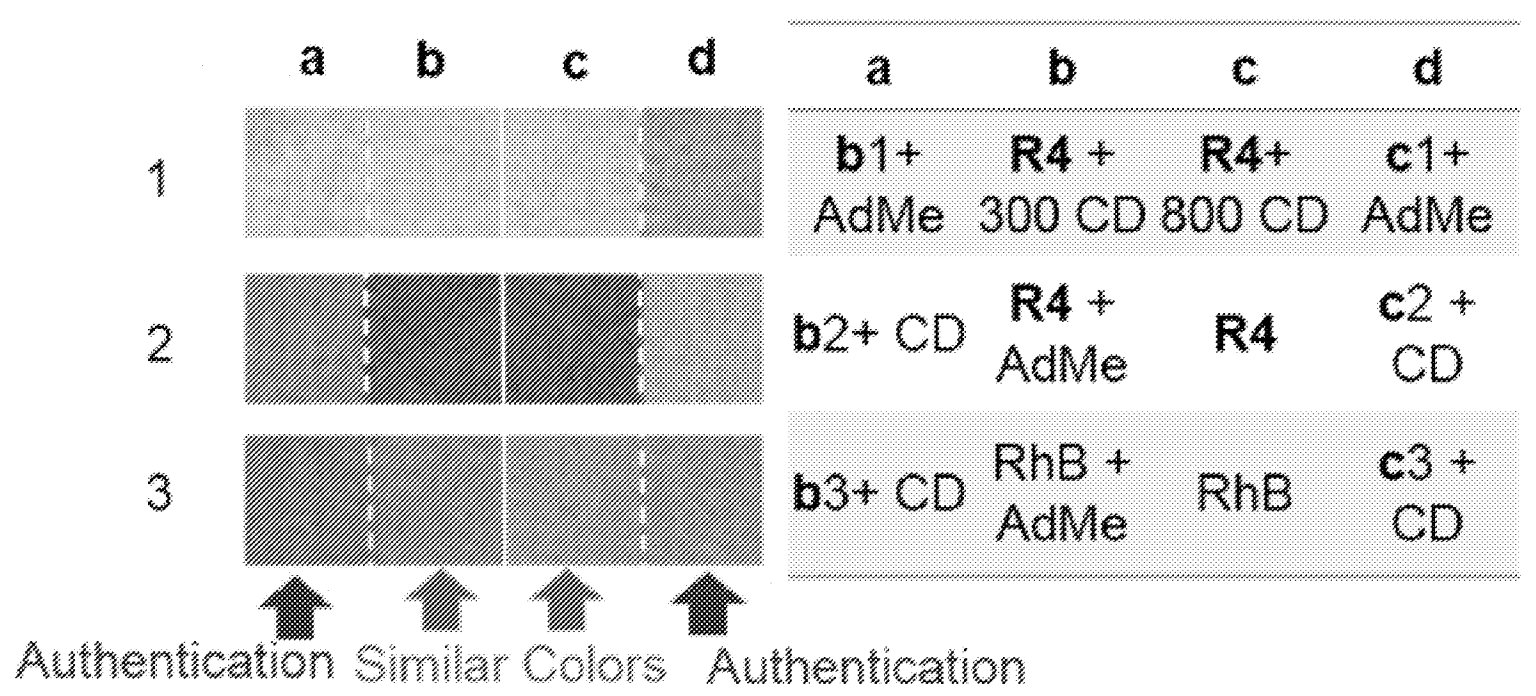
Figure 4C:
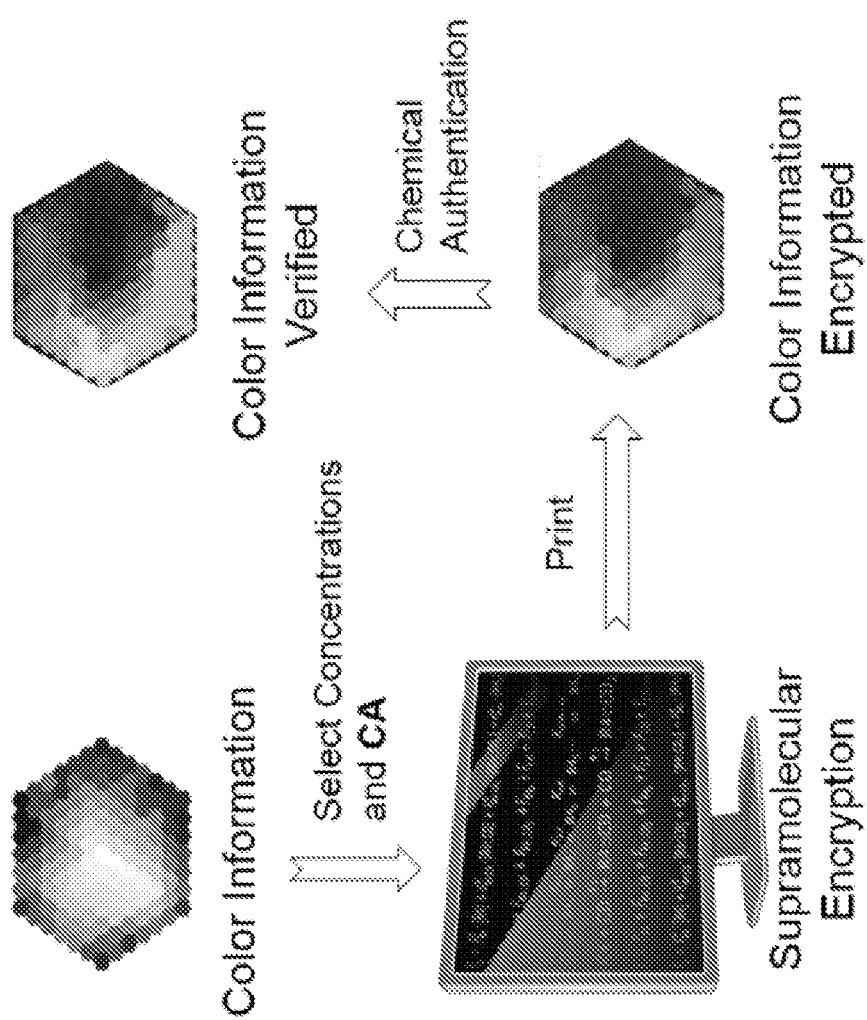

The use of the fluorescent dyes to print and authenticate a polychromic image is illustrated in the flowchart of FIG. 4C. Initially an ink composition color palette can be generated from a plurality of ink compositions characterized by different fluorescent emission spectra, depending upon the particular formulation of each ink composition. A number of the ink compositions from the color palette can then be selected for printing. Information about the nature and concentration of the components in each of the selected ink compositions is supramolecularly encrypted into characteristic fluorescent emission spectra that depend, in a non-linear fashion, on the concentration of fluorescent dye present in the ink composition and also on the nature and concentration of encapsulating agents and competitive binding agents in the ink composition. The selected ink compositions are then printed onto a substrate to form a polychromic image comprising the fluorescent dyes, thereby encrypting the fluorescence emission spectra information in the printed image. Finally, the authenticity of the printed image can be verified using a chemical authentication agent, as described above.

Examples

These examples illustrate a class of amorphous solid-state fluorescent materials that (i) can be printed as aqueous ink compositions, with a modular supramolecular encryption motif which (ii) provides access to broad-spectrum fluorescent color palettes that (iii) are inherently difficult to reverse engineer, and which (iv) respond rapidly to color-changing chemical authentication. In this example R4.4Cl is the heterorotaxane, γ-CD is used as an encapsulating agent, and Ad.Cl, AdMe.Cl or PyMe.Cl are used as a competitive binding agents.

The key dye compound is a heterorotaxane R4.4Cl, which can be synthesized (FIG. 1A) from cucurbit[6]uril (CB6), γ-cyclodextrin (γ-CD) and two fluorescent precursors, one (1.Cl) derived from pyrene and the other (2.2Cl) from a diazaperopyrenium (DAPP) dication. The efficient (83%) and rapid (~3 h) production (16) of R4.4Cl in water is facilitated (17, 18) by cooperative capture. It was initially envisioned that the CB6 and γ-CD rings in this heterorotaxane could prevent aggregation-induced quenching of the DAPP fluorophore, which exhibits (19) a high fluorescence quantum yield in solution (Φ=53%) but not in the solid state (Φ≈0).

Figure 1D:
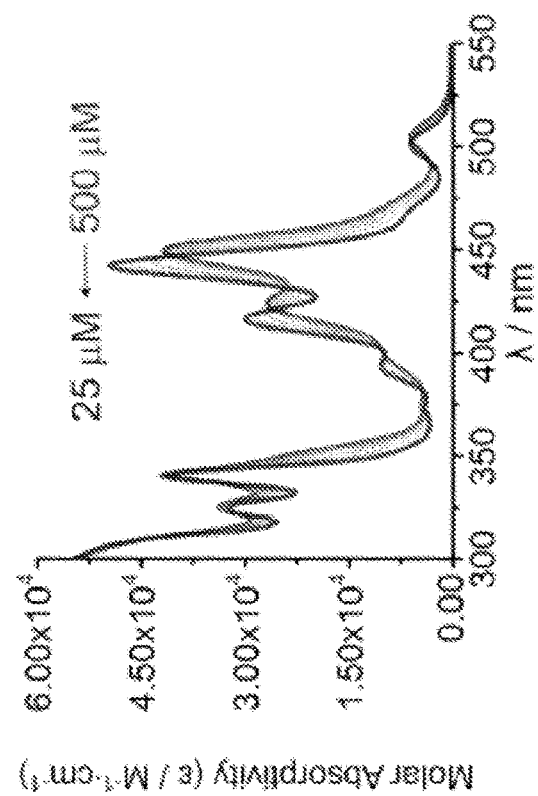
Figure 1C:
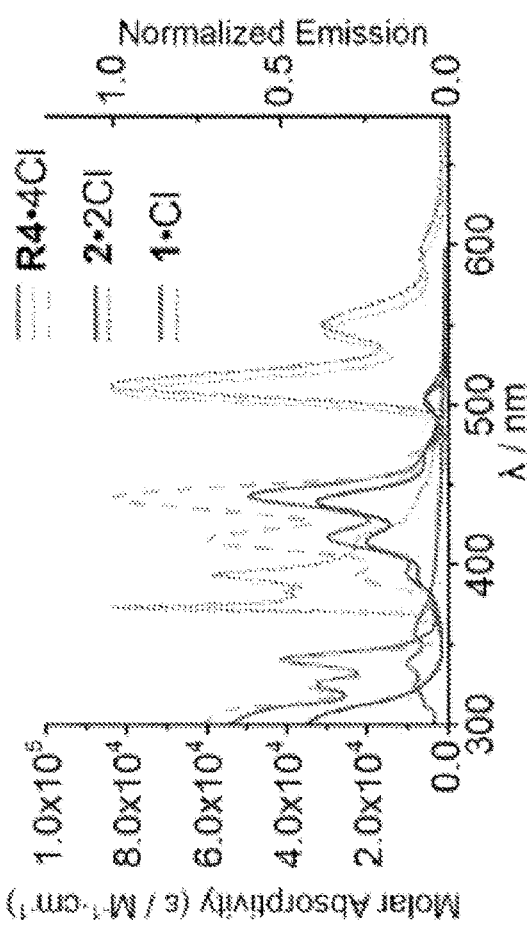

In its UV/Vis absorption spectrum (FIG. 1B), R4.4Cl has two characteristic absorption bands at 341 and 443 nm, which can be attributed (19) to electronic transitions in the pyrenyl and DAPP units, respectively. Despite the presence of the CB6 (20) and γ-CD rings (21), R4.4Cl is driven by intermolecular hydrophobic and π-π stacking interactions to form aggregates (R4$^{4+}$ agg) in water. A blue shift (7 nm) of the absorption band near 450 nm was recorded (FIG. 1D) in the concentration-dependent UV/Vis absorption spectrum of R4.4Cl upon dilution from 500 to 25 μM, while the shoulder around 350 nm, arising from the pyrene stopper, diminished. Assuming that aggregation is homogenous and non-cooperative (22), the aggregation constant $K_{agg}$ (23) was determined to be $1.6 \times 10^4$ M$^{-1}$. Irradiating the monomeric R4.4Cl (5 μM) at 340 and 443 nm resulted in identical fluorescence emission spectra with an emission maximum (Φ=52.4%) at 510 nm. No emission was observed at 390 nm, indicating (FIG. 1C) the transfer of the excited state energy from pyrene to DAPP by a Forster resonance energy transfer (FRET) mechanism (24) with near-quantitative (>99%) efficiency.

Figure 1F:
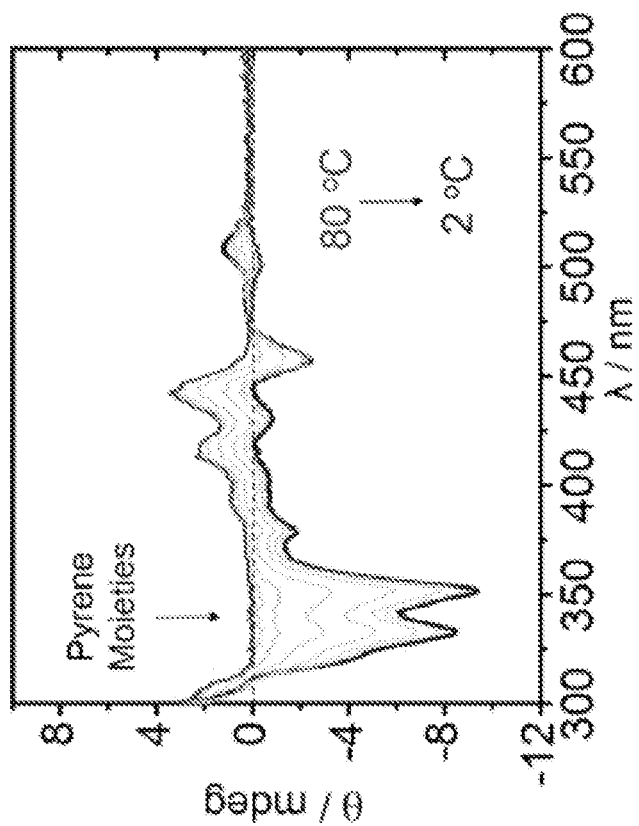
Figure 1E:
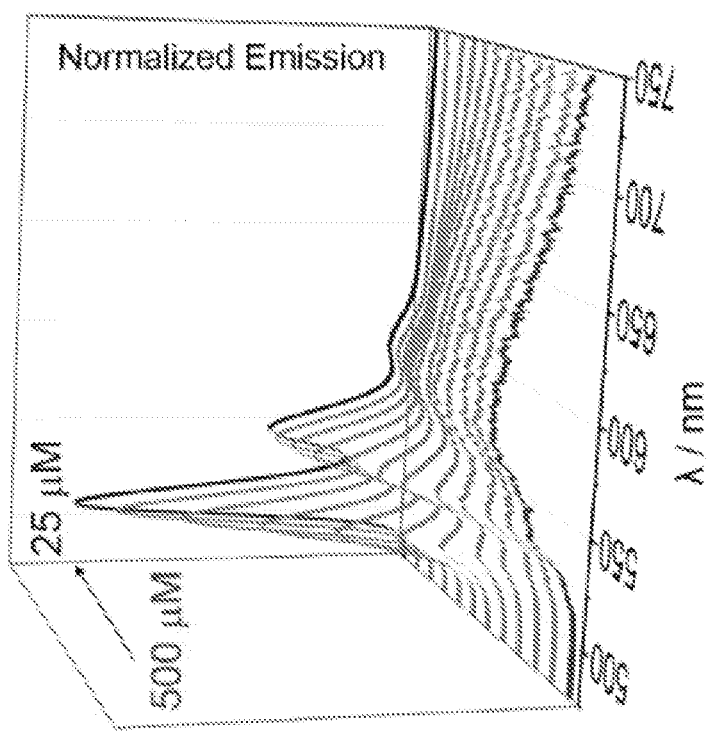

As R4.4Cl undergoes increased aggregation at higher and higher concentrations, its narrow emission band (FIG. 1E) at 510 nm was gradually replaced by a broad, featureless band around 610 nm, implying that either excimers (DAPP homodimers) or exciplexes (pyrenyl-DAPP heterodimers) are being formed in the excited state. Circular dichroism spectra reveal (FIG. 1F) that the aggregation of R4.4Cl (200 μM) is temperature dependent. As the temperature was lowered from 80° C. (monomeric state) to 2° C. (aggregated state), the positive induced circular dichroism (ICD) signals diminished as a negative ICD peak, attributable to the pyrene stoppers, appeared at around 350 nm, indicating (25, 26) that these stoppers congregate near the rims of the γ-CD ring. Since γ-CD encircles DAPP, it follows that pyrene-DAPP heterodimers (FIG. 1B), and their corresponding exciplexes, are responsible for the observed aggregation and emission behavior of R4.4Cl.

The equilibrium (FIG. 2A) between monomeric and aggregated states of R4.4Cl can be manipulated by chemical means. Assuming that aggregation is non-cooperative, the R4$^{4+}$$_2$ dimer can be considered (22) as a simplified case of R4$^{4+}$$_{agg}$, in which $K_{agg} = \frac{1}{4}[R4^{4+}_2] \cdot [R4^{4+}]^{-2}$. Encapsulation of the pyrene stoppers by γ-CD promotes the disassembly of R4$^{4+}$$_2$ in favor of a monomeric R4$^{4+}$ ⊂ γ-CD$_2$ complex, formed from a R4$^{4+}$ ⊂ γ-CD intermediate, with an equilibrium constant $K_{CD} = K_1 \cdot K_2$. This disassembly process can be reversed by introducing a competitive binding agent (CA) which competes for γ-CD in solution with an association constant, $K_{CA}$. Combining these equilibria, the system is described by

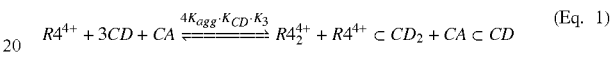

$$R4^{4+} + 3CD + CA \xrightleftharpoons{4K_{agg} \cdot K_{CD} \cdot K_3} R4_2^{4+} + R4^{4+} \subset CD_2 + CA \subset CD \quad \text{(Eq. 1)}$$

Since $K_{agg}$ and $K_{CD}$ are fixed for R4.4Cl, these equilibria are sensitive to four variables—namely, the initial concentrations (i.e., [R4$^{4+}$]$_0$, [CD]$_0$, and [CA]$_0$) of each component and $K_{CA}$. In an aqueous solution containing R4.4Cl, γ-CD and CA, the fluorescence intensity $I_\lambda$ at a given wavelength λ is the sum of the emission intensities of each component, which is given by

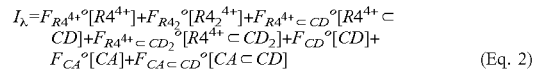

$$I_\lambda = F_{R4^{4+}}°[R4^{4+}] + F_{R4_2^{4+}}°[R4_2^{4+}] + F_{R4^{4+} \subset CD}°[R4^{4+} \subset CD] + F_{R4^{4+} \subset CD_2}°[R4^{4+} \subset CD_2] + F_{CD}°[CD] + F_{CA}°[CA] + F_{CA \subset CD}°[CA \subset CD] \quad \text{(Eq. 2)}$$

where F° is the molar fluorescence coefficient at wavelength λ. Note that the use of a non-fluorescent CA such as 2-adamantylamine hydrochloride (Ad.Cl; $K_{CA}=90$ M$^{-1}$) simplifies Eq. 2, since, in this instance, the terms F°$_{CA}$[CA] and F°$_{CA \subset CD}$[CA ⊂ CD] are reduced to zero. Combining this simplified form of Eq. 2 with Eq. 1,

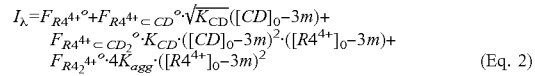

$$I_\lambda = F_{R4^{4+}}° + F_{R4^{4+} \subset CD}° \cdot \sqrt{K_{CD}}([CD]_0 - 3m) + F_{R4^{4+} \subset CD_2}° \cdot K_{CD} \cdot ([CD]_0 - 3m)^2 \cdot ([R4^{4+}]_0 - 3m) + F_{R4_2^{4+}}° \cdot 4K_{agg} \cdot ([R4^{4+}]_0 - 3m)^2 \quad \text{(Eq. 2)}$$

where m is the molar concentration of CA being encapsulated by γ-CD. Knowledge of the initial concentrations and equilibrium constants allows Eq. 3 to be solved.

Figure 2B:
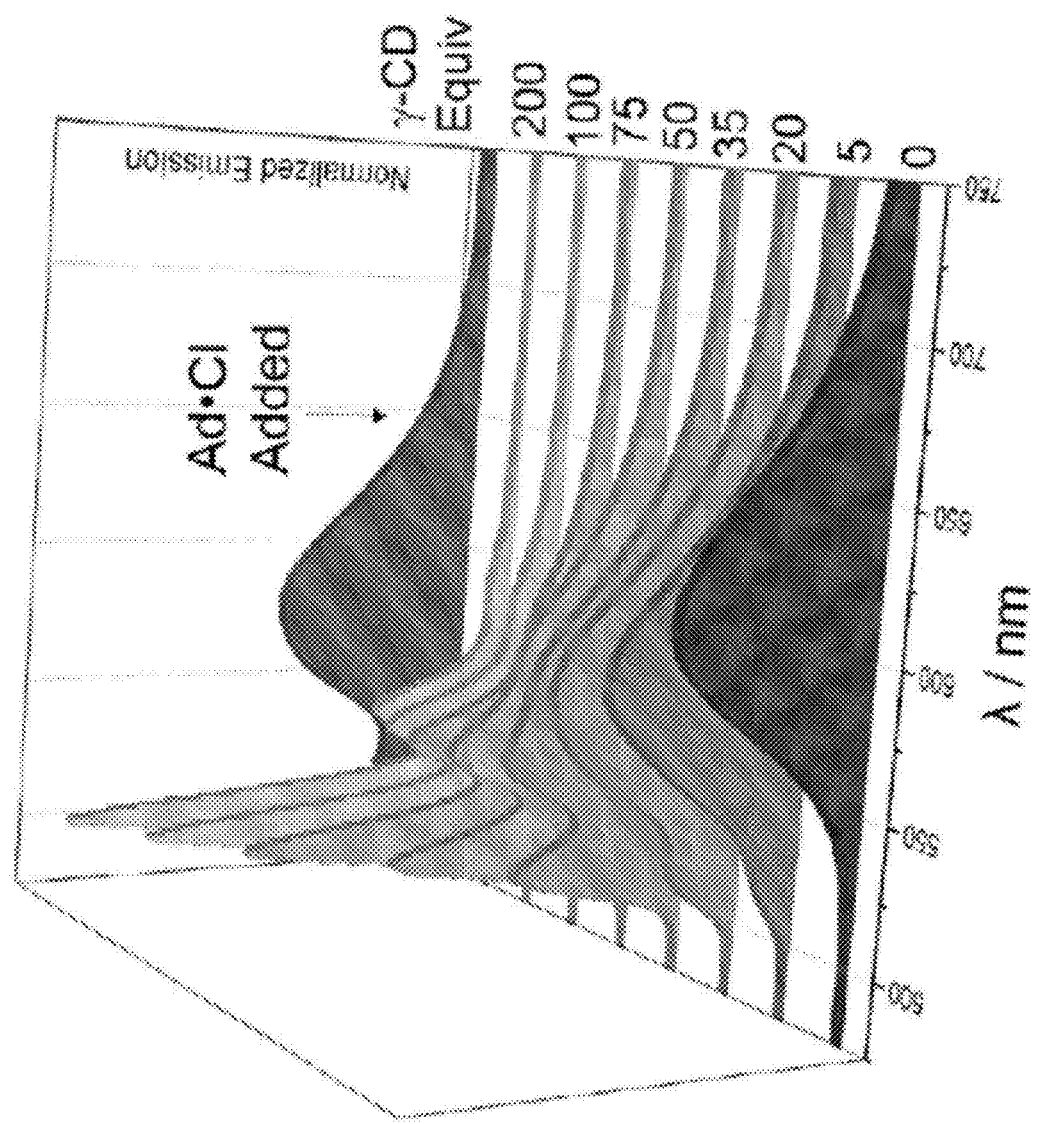
Figure 2C:
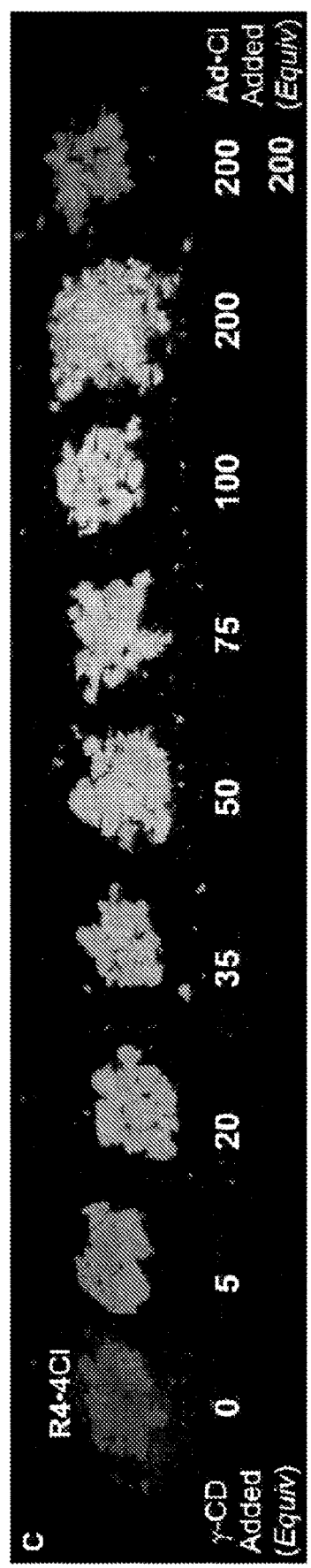

The solid-state fluorescence outputs (FIGS. 2B and 2C) of R4$^{4+}$ and R4$^{4+}$ ⊂ γ-CD$_2$ reflect their solution outputs. Emission from amorphous mixtures of R4.4Cl:γ-CD ranged (FIG. 2C) from $\lambda_{max}=610$ nm (Φ=7.7%) with no γ-CD (R4$^{4+}$ agg) to 510 nm (Φ=42.5%) in the presence of 200 equiv of γ-CD (R4$^{4+}$ ⊂ CD$_2$). Solid-state emission was also conserved from solution when [CA] was non-zero. For example, the addition of 200 equiv of Ad.Cl to a mixture comprising R4.4Cl:γ-CD (molar ratio: 1:200) resulted in a red-shift (FIGS. 2B and 2C) of the emission back to $\lambda_{max}=580$ nm. Thus, the ratio of R4.4Cl, γ-CD, and Ad.Cl can be used, as described by Eq. 3, to tune the solid-state fluorescence reversibly over a wide color range from green through to red.

Figure 3B:
FIGS. 3A-M. Supramolecular encryption with fluorescent security inks.
Figure 3A:
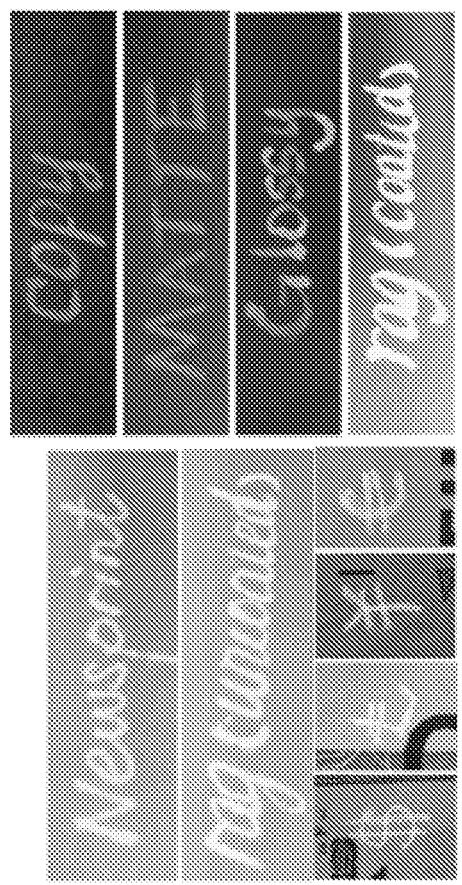
Figure 3C:
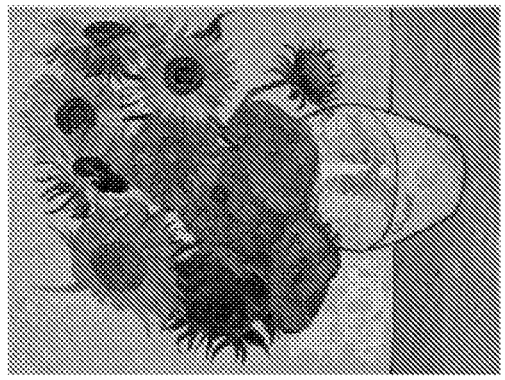
Figure 3D:
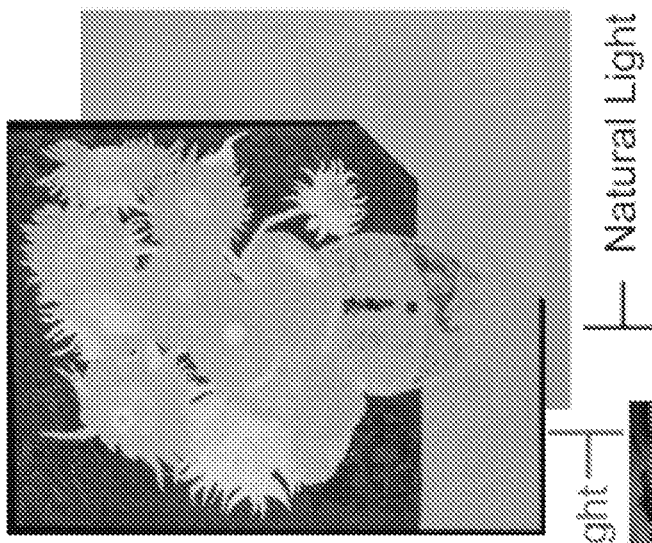
Figure 3E:
Figure 3L:
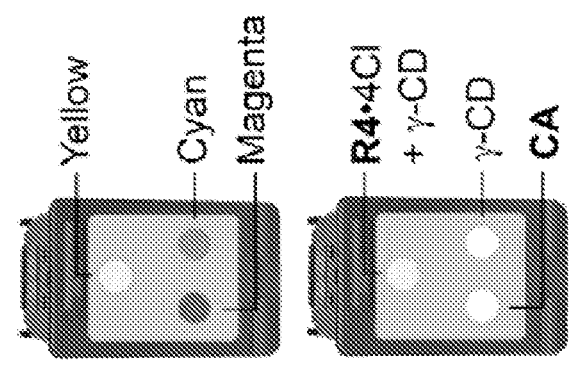
Figure 3M:
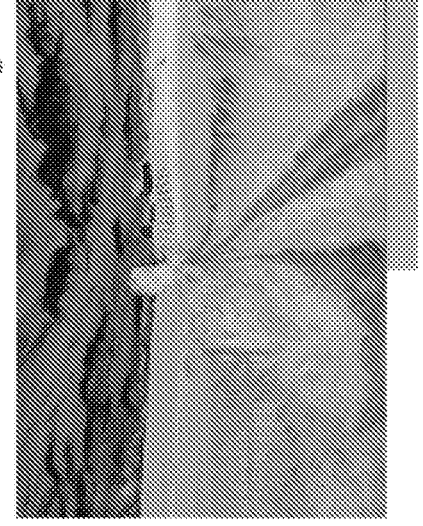

Since R4$^{4+}$-based aqueous solutions are compatible with both handwriting and inkjet printing technologies, they can be applied (FIG. 3) as fluorescent inks. We found that the R4$^{4+}$ ⊂ CD$_2$ ink exhibits an unusual phenomenon—the color of its emission depends (FIG. 3A) on the type of paper used as a result of varying noncovalent interactions with papers of different compositions. Under UV light, R4.4Cl appears reddish-orange and R4$^{4+}$ ⊂ CD$_2$ appears green on rag paper, newsprint, and banknotes, consistent with the corresponding powders, whereas, on various types of ordinary white paper (FIG. 3A and Table 1), both of these inks appear reddish-orange. A monochromic QR code (FIG. 3B) printed on paper from an inkjet cartridge contains information that, although invisible under natural light, can be read on a smartphone under UV light. By loading aqueous solutions of $R4^{4+} \subset CD_2$ ($R4^{4+}$: γ-CD=1:50), γ-CD, and Ad.Cl into a tri-color inkjet cartridge (FIG. 3C), polychromic fluorescence printing is possible, provided that the rates of supramolecular encapsulation are faster than the rates of printing and drying. A fluorescent reproduction of van Gogh's 'Sunflowers' and its digital replica (FIG. 3D and FIG. 3E, respectively) demonstrate the feasibility of printing broad-spectrum polychromic images with good color resolution. It is worth noting that $R4^{4+}$ is well-placed for assimilation into a commercial setting on account of its simple and high-yielding synthesis from commodity chemicals. A fluorescent replica of Briex's 'Apostelhoeve Wine Estate Maastricht' printed using an inkjet cartridge with the same setting as in FIG. 3K under UV and natural light and its digital replica are shown in FIGS. 3L and 3M, respectively.

Figure 3F:
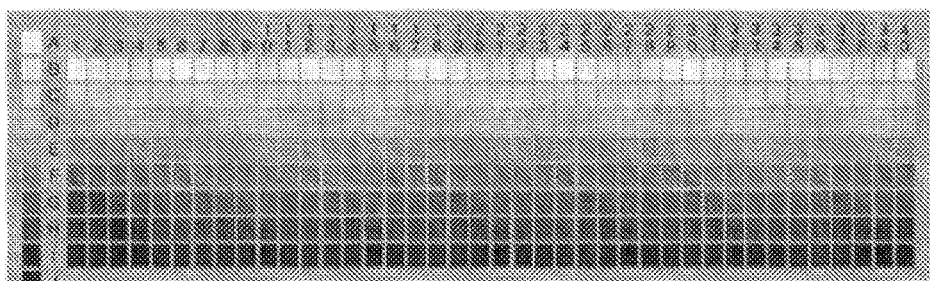
Figure 3G:
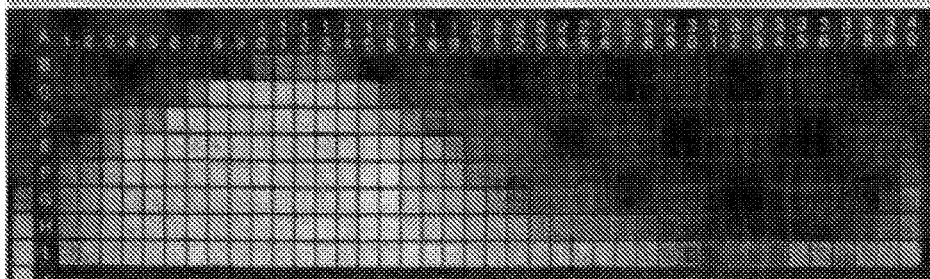
Figure 3H:
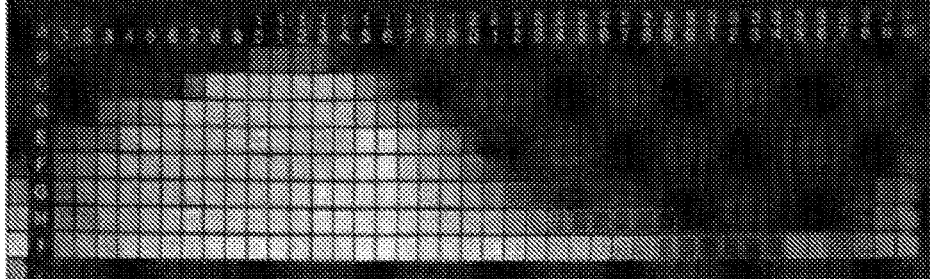
Figure 3I:
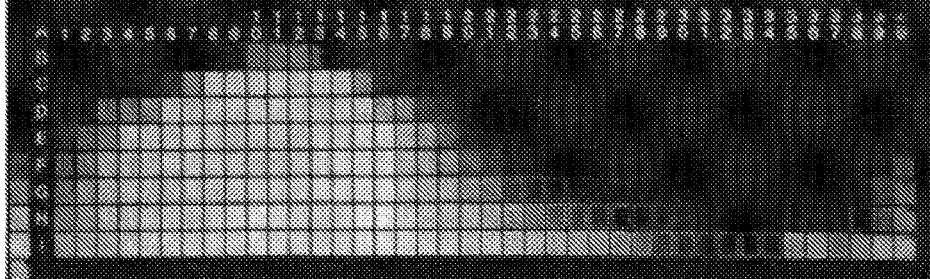
Figure 3J:
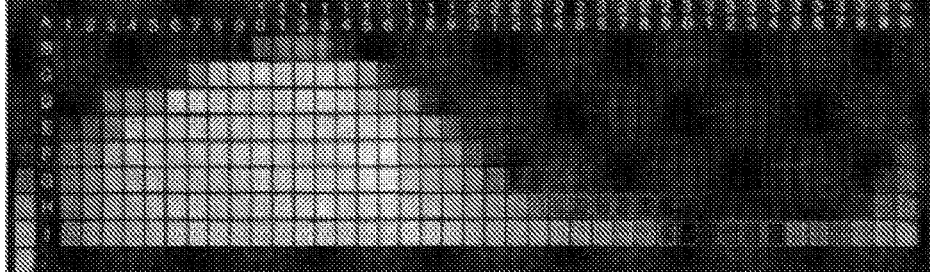
Figure 3K:
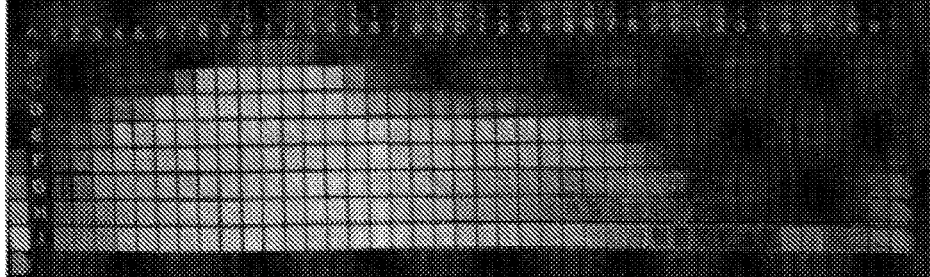

At a fundamental level, the nonlinear nature of this system's sensitivity to concentrations of components and their equilibrium constants (Eq. 3) points towards a general concept whereby complex supramolecular equilibria in aqueous solution can be used as a chemical encryption method. Even with access to all of the ink components, it would be challenging for counterfeiters to reproduce a printed color palette without having a complete knowledge of the inks' initial concentrations and channel assignments in the print cartridge. In an attempt to demonstrate the non-linear nature of this system, we have printed fluorescent color palettes (FIGS. 3G-3J) using various ink concentrations and different CAs. (A standard color palette is shown in FIG. 3F.) A broad range of colors from green to red were printed (FIG. 3G) when Ad.Cl was used as the competitor. The color palette was also sensitive to the association strength of the competitor, noting the differences between images printed from equally concentrated solutions of Ad.Cl (FIG. 3G) and a stronger-binding competitor (FIG. 3H), namely, 1-adamantanemethylamine hydrochloride (AdMe.Cl, $K_{AdMe}$=127 $M^{-1}$). Reducing the concentrations of either CA (FIGS. 3H and 3I) or γ-CD (FIGS. 3H and 3J) contracts the color spectrum in the greenish-yellow region or yellowish-red region, respectively. The color range of the fluorescent inks can be expanded to accommodate RGB printing (FIG. 3K) by choosing a fluorescent CA, such as a fragment of the R4.4Cl, 1-pyrenemethylamine hydrochloride (PyMe.Cl), with blue emission. The ability to exchange fluorescent and non-fluorescent CAs in a modular and user-controlled manner elevates the anti-counterfeiting features possessed intrinsically by this security ink.

The dynamic nature of the inks makes them amenable to a variety (FIG. 4) of fraud detection tests. Exposure of a printed image (FIG. 4A) to aqueous solutions of different CAs results (Eq. 3) in nonlinear color changes. Printing non-fluorescent AdMe.Cl or CD on top of an existing document changes the existing color gradient of the image, while printing fluorescent PyMe.Cl or 1,3,6,8-pyrenetetrasulfonic acid tetrasodium (PTSA.4Na) creates new colors such as blue and purple by shifting the complex equilibria or extent of counterion exchange. A characteristic color change can also be brought about through the application of a quencher, such as tryptophan, or even by simply soaking the printed image in water for as little as 1-2 mins, during which time γ-CD and the CA will be washed away. Not only can these authentication agents discriminate between images produced by the $R4^{4+}$-based ink and other dyes, but they can also distinguish those produced using different ink formulations containing $R4^{4+}$. Blocks of a given fluorescence color (FIG. 4B, lanes 1b-c and 2b-c), which appear almost identical to one another under UV light, but are formulated differently, were found to result in noticeably different colors (FIG. 4B, lanes 1a, 1d, 2a, and 2d) after the application of the same amount of an authentication agent. Since hundreds of chemicals meet the criteria to be competing agents, in principle we can generate an infinite library of different ink systems and authentication tests using this supramolecular encryption method. A flow chart of the authentication process is shown in FIG. 4C.

We have developed a stimulus-responsive solid-state fluorescent heterorotaxane, prepared from simple materials using a cooperative capture method, and applied it as a component of fluorescent security inks. The solid-state emission of these security inks can be fine-tuned over a wide emission range with rapid response to chemical stimuli. The printed information is encrypted in a chemical language based on a nonlinear equation that describes a dynamic network, which can generate a potentially infinite library of different fluorescent color palettes. In contrast with conventional dyes, the encrypted information printed with the heterorotaxane inks can be verified using chemical authentication without revealing the original color image information.

Materials and Methods

All reagents were purchased from commercial suppliers (Aldrich, Fisher and Wacker) and used as received. Thin layer chromatography (TLC) was performed on silica gel 60 F254 (E. Merck). Column chromatography was carried out on silica gel 60F (Merck 9385, 0.040-0.063 mm). UV/Vis Absorption spectra were measured on a Shimadzu 3600 UV/Vis/NIR spectrometer with a temperature control system, employing cuvettes with path lengths of 1 and 10 mm. Steady-state fluorescence spectra of liquid samples were measured on a Horiba FluoroMax-4 spectrofluorometer. Steady-state fluorescence spectra of solid samples were measured on an ISS PC1 Fluorimeter. Absolute fluorescence quantum yields were measured on a Horiba FluoroMax-4 spectrofluorometer with a Quanta-<p integrating sphere attachment, and the resulting data were analyzed by the 4-curve method using the FluorEssence 3.5 software. Circular dichroism spectra were measured on a Jasco J-815 Circular Dichoism spectrometer with a temperature control system. Dynamic light scattering data were obtained on a Malvern Zetasizer Nano with a 633 nm He—Ne laser light source. Nuclear magnetic resonance (NMR) spectra were recorded on Bruker Avance 500 or 600 spectrometers with working frequencies of 500 or 600 MHz for 1H and 125 or 150 MHz for 13C nuclei, respectively. Low-resolution electrospray ionization mass spectra (ESI-MS) were recorded on either an Agilent 1100 MSD or a Thermo Finnegan LCQ instrument. High-resolution electrospray ionization mass spectra (HR-ESI-MS) were recorded on an Agilent 6210 LC-TOF instrument with Agilent 1200 HPLC introduction. Writing tests were performed using Pilot Parallel pens, which were filled with customized ink cartridges. Printing tests were performed using a HP Photosmart CP4780 inkjet printer with HP60 black and tricolor ink cartridges, which were filled with customized inks.

Synthetic Protocols
Synthesis of 1·Cl

Scheme S1. Synthesis of 1·Cl

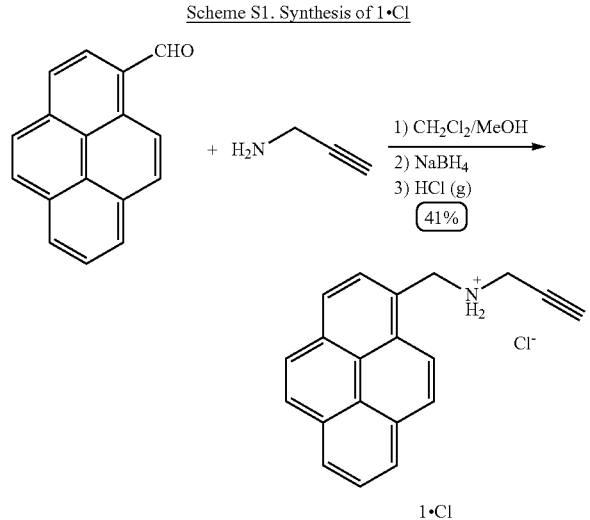

1·Cl (27): 1-Pyrenecarboxaldehyde (2.00 g, 8.69 mmol) was dissolved in CH$_2$Cl$_2$/MeOH (v/v, 4:1, 50 mL) and propargylamine (0.62 mL, 9.6 mmol) was added to the solution. The reaction mixture was heated under reflux in an atmosphere of nitrogen for 18 h. After all the 1-pyrenecarboxaldehyde had been consumed (monitored by TLC), the reaction mixture was cooled to 0° C. then NaBH$_4$ (1.50 g) was added in portions to the reaction mixture. After stirring for 6 h, an aqueous HCl solution (37% w/w, 6 mL) was added to quench the excess of NaBH$_4$ in the reaction mixture. The solvent was removed under reduced pressure and then an aqueous 2 M NaOH solution (50 mL) was added. The reaction mixture was extracted with CH$_2$Cl$_2$ (3×100 mL) and the organic phase was dried (Na$_2$SO$_4$). The CH$_2$Cl$_2$ solution was purged with an excess of HCl gas (HCl gas was generated by adding saturated aqueous HCl solution to anhydrous CaCl$_2$)), whereupon precipitation occurred. The precipitate was collected by filtration and washed with an excess of CH$_2$Cl$_2$ to afford 1.Cl as a light yellow powder (1.10 g, 41%).

Synthesis of 2.2Cl

Scheme S2. Synthesis of compound S2

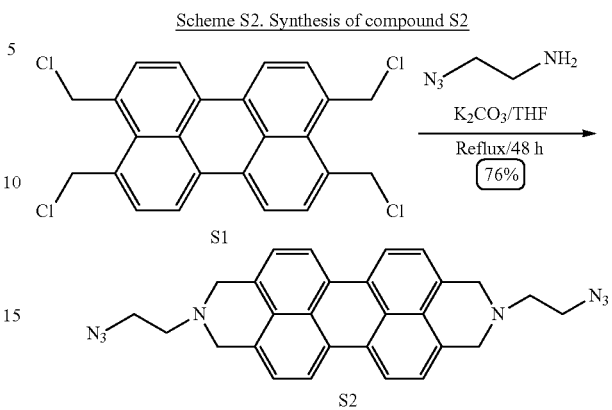

S2: Compound S2 was synthesized using a protocol based on a previously reported procedure (28) with slight modifications. Compound S1 (0.50 g, 1.12 mmol), 2-azidoethylamine (29) (1.46 g, 17.0 mmol) and K$_2$CO$_3$ (1.00 g, 7.24 mmol, anhydrous) in anhydrous THF (50 mL) was heated under reflux in an atmosphere of nitrogen for 48 h. The solvent was then removed under reduced pressure and the residue was purified by column chromatography (SiO$_2$, gradient CH$_2$Cl$_2$-10% Me$_2$CO in CH$_2$Cl$_2$ (m/v), Rf=0.4) to afford the product S2 as an orange-yellow powder (402 mg, 76%). Caution: In the previously reported procedure, (3) simple washing by H$_2$O and Et$_2$O is not sufficient to remove all the byproducts of the reaction. The product S2, purified after column chromatography, is highly soluble in common organic solvents.

Scheme S3. Synthesis of 2·2Cl

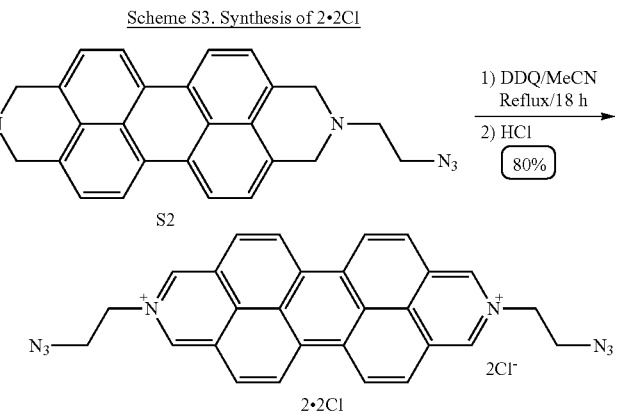

2.2Cl: The diazide 2.2Cl was synthesized based on a previously reported method (30) with slight modifications. Compound S2 (0.50 g, 1.06 mmol) and 2,3-dichloro-5,6-dicyano-1,4-benzoquinone (DDQ) in anhydrous degassed MeCN (80 mL) was heated under reflux in an atmosphere of nitrogen for 18 h. The reaction mixture was cooled to room temperature, followed by adding 6 mL of aqueous HCl solution (37% w/w), which generated a precipitate. This precipitate was collected by filtration and washed with 1:1 Et$_2$O/MeCN (4×50 mL) to afford a crude product as a dichloride salt. The impurities in the crude product were removed effectively by initiating two cycles of a counterion exchange procedure. Firstly, an excess of $NH_4PF_6$ was added to the aqueous solution of the crude product in order to exchange the counterion from Cl to $PF_6$ and generate $2.2PF_6$ as an orange precipitate. The precipitate was collected by filtration and washed with an excess of $H_2O$. The second counterion exchange process involved adding a large excess of tetrabutylammonium chloride (TBACl) to a MeCN solution of $2.2PF_6$. The precipitate which formed was collected by filtration and washed with an excess of MeCN to afford pure 2.2Cl as a dark yellow powder (455 mg, 80%).

Synthesis of [3]Rotaxane $R3^{4+}$ and [4]Rotaxane $R4^{4+}$

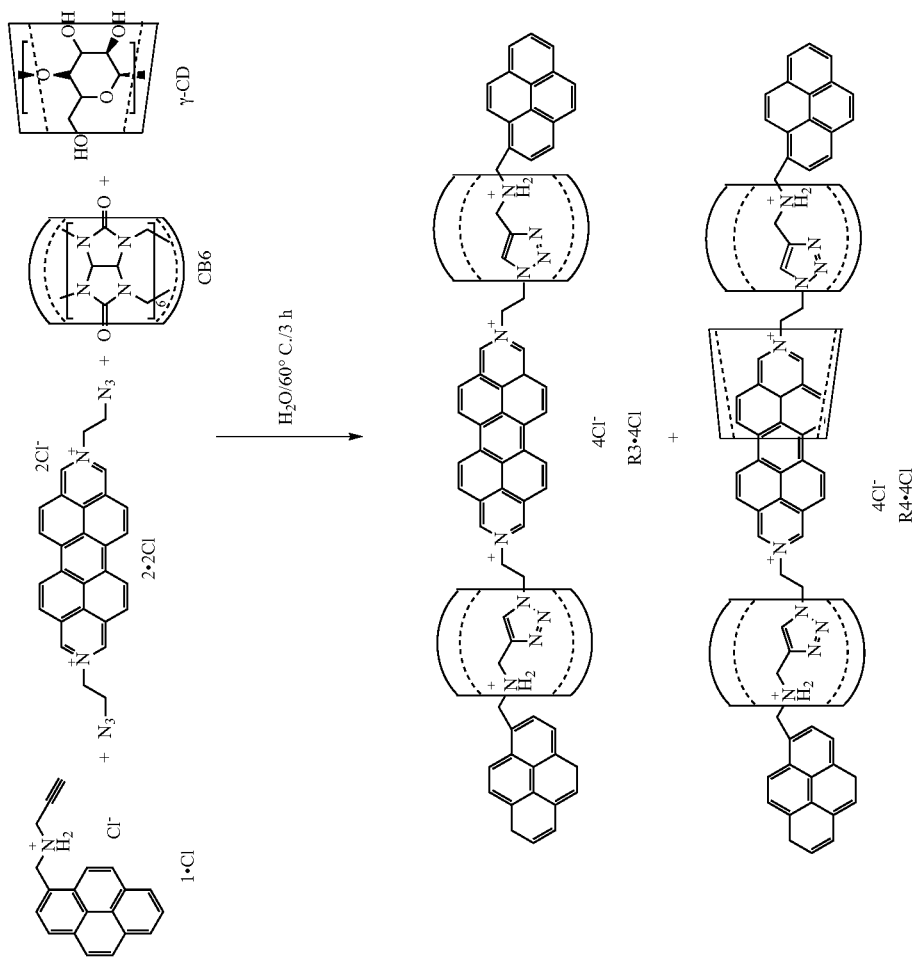
Scheme S4. Synthesis of the hetero[3]rotaxane R3·4Cl and the hetero[4]rotaxane R4·4Cl General procedure for the synthesis of [3]rotaxane $R3^{4+}$ and the [4]rotaxane $R4^{4+}$. The stopper precursor 1.Cl (2.2 equiv), the dumbbell precursor 2.2Cl (1.0 equiv), and γ-CD (2.5-20 equiv) were mixed in $H_2O$ and stirred at 60° C. for 10 min before CB6 (2.5 equiv) was added. The reaction mixture was stirred at 60° C. for a further 18 h. Afterwards, insoluble residues were filtered off from the reaction mixture and an excess of $NH_4PF_6$ was added to the filtrate. The precipitate which formed was collected by filtration and washed with an excess of $H_2O$. This mixture of products was dissolved in MeCN and subjected to reverse-phase analytical HPLC analysis (C18 column, 5 μm packing, length 150 mm, diameter 4.6 mm, eluent: 0 min 0.1% TFA in $H_2O$ 99.9% to 40 min 0.1% TFA in 99.9% MeCN, flow rate: 1 mL/min). An excess of $Bu_4NCl$ was added to this MeCN solution to ensure that all the counterions were exchanged to Cl⁻ ions. The precipitate which formed was collected, washed with an excess of MeCN and purified on a reverse-phase C18 column (150 gram, RediSep Rf Gold C18Aq) on an automatic column chromatography system (Combiflash Rf200, Teledyne Isco, eluent: $H_2O$/MeCN (0.1% TFA) =100/0 to 0/60 in 40 mins, flow rate: 85 mL/min) to afford $R3^{4+}$ and $R4^{4+}$ as their TFA salts. The appropriate fractions containing $R3^{4+}$ were collected and the counterion of the $R3^{4+}$ was exchanged first of all to $PF_6^-$ on addition of an excess of $NH_4PF_6$ to the collected fractions. After removal of MeCN under reduced pressure, the product $R3.4PF_6$ (3-41%) precipitated out from the solution and it was collected by vacuum filtration with extensive washing with $H_2O$.

The [3]rotaxane R3.4Cl was obtained after a second counterion exchange procedure wherein an excess of $Bu_4NCl$ was added to a MeCN solution of $R3.4PF_6$, resulting in the formation of a precipitate, which was collected by vacuum filtration, washed with excess of MeCN and dried under vacuum to afford R3.4Cl (2-39%) as an orange powder.

Optimized synthesis of the hetero[4]rotaxane R4.4Cl. The stopper precursor 1.Cl (67 mg, 0.22 mmol), the dumbbell precursor 2.2Cl (54 mg, 0.10 mmol), and γ-CD (1287 mg, 1.00 mmol) were mixed together in $H_2O$ (35 mL) and stirred at 60° C. for 10 min before CB6 (250 mg, 0.25 mmol) was added. The reaction mixture was stirred for a further 3 h at 60° C. Thereafter, the insoluble residues were filtered off from the reaction mixture. The filtrate was loaded directly onto a reverse-phase C18 column (150 gram, RediSep Rf Gold C18Aq) on an automatic column chromatography system (Combiflash Rf200, Teledyne Isco) (eluent: $H_2O$/MeCN (0.1% TFA)=100/0 to 0/60 in 40 mins, flow rate: 85 mL/min). The appropriate fractions containing $R4^{4+}$ were collected and the counterion of the $R4^{4+}$ was exchanged to $PF_6^-$ on addition an excess of $NH_4PF_6$ to the collected fractions. After removal of MeCN under reduced pressure, the product $R4.4PF_6$ (416.4 mg, 85%) precipitated out from the solution: it was collected by vacuum filtration with extensive washing with $H_2O$.

The [4]rotaxane R4.4Cl was obtained after a second counterion exchange procedure wherein an excess of $Bu_4NCl$ was added to a MeCN solution of $R4.4PF_6$, resulting in the formation of a precipitate, which was collected by vacuum filtration, washed with excess of MeCN and dried under vacuum to afford R4.4Cl (371 mg, 83%) as an orange powder.

TABLE 1

Yields of the hetero[3]rotaxane R3•4Cl and the hetero[4]rotaxane R4•4Cl synthesized from precursors 1•Cl (2.2 mM) and 2•2Cl (1 mM), CB6 and γ-CD at various temperatures.

| Entries | Temperature (° C.) | 1•Cl (Equiv) | 2•2Cl (Equiv) | CB6 (Equiv) | γ-CD (Equiv) | Yield/% R3•4Cl | R4•4Cl |
|---|---|---|---|---|---|---|---|
| 1 | 0 | 2.2 | 1.0 | 2.5 | 10 | 2 [a] | 12 [a] |
| 2 | 20 | 2.2 | 1.0 | 2.5 | 10 | 8 [a] | 48 [a] |
| 3 | 40 | 2.2 | 1.0 | 2.5 | 10 | 21 [a] | 71 [a] |
| 4 | 60 | 2.2 | 1.0 | 2.5 | 2.5 | 39 [b] | 9 [b] |
| 5 | 60 | 2.2 | 1.0 | 2.5 | 5 | 24 [b] | 21 [b] |
| 6 | 60 | 2.2 | 1.0 | 2.5 | 10 | 11 [a] | 88 [a] |
| 7 | 60 | 2.2 | 1.0 | 2.5 | 10 | 8 [b] | 83 [b] |
| 8 | 60 | 2.2 | 1.0 | 2.5 | 20 | 17 [b] | 56 [b] |
| 9 | 80 | 2.2 | 1.0 | 2.5 | 10 | 16 [a] | 81 [a] |

[a] Yields estimated by the integration of the corresponding peaks in the reverse-phase analytical HPLC traces.
[b] Isolated yields.

Scheme S5. Synthesis of the hetero[3]rotaxanes SR4•4Cl

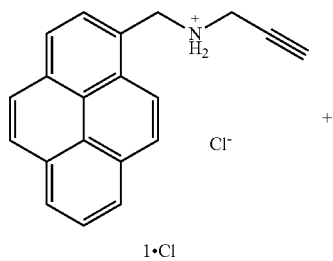

1•Cl

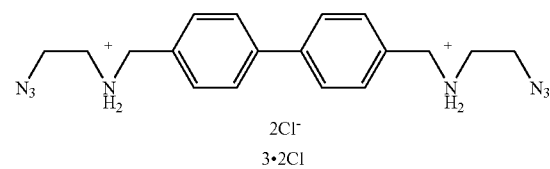
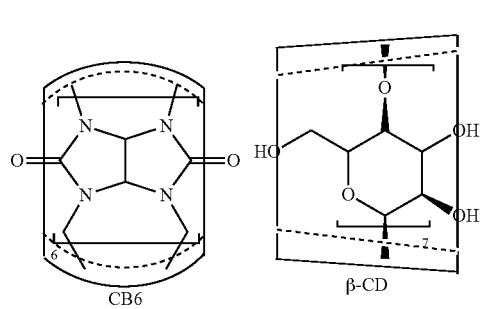
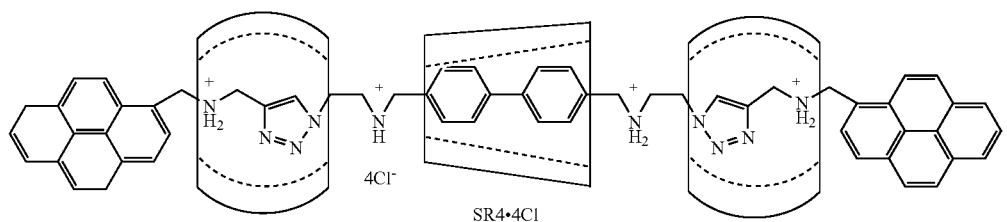

The stopper precursor 1.Cl (110.2 mg, 0.36 mmol), the dumbbell precursor 3.2Cl (50.7 mg, 0.12 mmol), and γ-CD (272.6 mg, 0.36 mmol) were mixed in $H_2O$ (50 mL) and stirred at 60° C. for 10 min before CB6 (359.2 mg, 0.24 mmol) was added. The reaction mixture was stirred at 60° C. for a further 3 h. Thereafter, the insoluble residues were filtered off from the reaction mixture. The filtrate was loaded directly onto a reverse-phase C18 column (150 gram, RediSep Rf Gold C18Aq) on an automatic column chromatographic system (Combiflash Rf200, Teledyne Isco) in order to isolate the desired product (eluent: H2O/MeCN (0.1% TFA)=100/0 to 0/60 in 40 mins, flow rate: 85 mL/min). The appropriate fractions containing $SR4^{4+}$ were collected, and the solvent was removed under reduced pressure. The residue was dissolved in $MeNO_2$, and the counterion of the $SR4^{4+}$ was exchanged to $Cl^-$ on addition of an excess of tetrabutylammonium chloride. The resulting white precipitate was collected by vacuum filtration, washed with an excess of $MCNO_2$ and dried under vacuum to afford SR4.4Cl (464.3 mg, 93%) as a white powder.

Isothermal Titration Calorimetry (ITC) Studies on 2.2Cl with γ-CD

Sample Preparation: 2.2Cl (1.8 mg) was dissolved in $H_2O$ (10 mL) and an excess of CB6 (14 mg) was added to the solution. The mixture was placed in an ultrasonic bath for 10 min and then passed through a syringe filter (0.25 m). The generated bright yellow solution of the complex 2.2Cl⊂CB6 was then used for ITC.

The heat (dQ/dt) generated during titrations by the complexation between 2.2Cl⊂CB6 and γ-CD was too weak to be measured accurately by ITC. This result suggests that the binding constant (Ka) of 2.2Cl⊂CB6 and γ-CD was below the lower limit of the ITC measurement ($Ka<50\ M^{-1}$)

Förster Resonance Energy Transfer (FRET) Studies

The emission of the pyrenyl unit of 1.Cl exhibited a significant overlap with the absorption of the DAPP unit in 2.2Cl, suggesting that the FRET process could take place if the donor 1.Cl and the acceptor 2.2Cl were in close proximity. In the UV-Vis spectrum of an aqueous R4.4Cl solution, characteristic absorption bands attributed to the pyrenyl and DAPP units were observed in the 318-365 and 365-520 nm regions. The emission spectrum of R4.4Cl was independent of the excitation wavelength, giving identical emission spectra. No pyrenyl unit emission was observed at around 350-450 nm. The excitation spectrum of R4.4Cl was similar to its UV-Vis spectrum. These results indicate that energy transfer between the pyrenyl and DAPP units takes place with near quantitative (>99%) efficiency. The simulated structure of $R4^{4+}$ showed that the distance between the pyrenyl and DAPP unit is within 10-12 Å.

Quantum Yield Measurements

Absolute fluorescence quantum yields were measured using a Horiba FluoroMax-4 spectrofluorometer with a Quanta-φ integrating sphere attachment. Data were analyzed by the 4- curve method using the FluorEssence 3.5 software. Typically, the quantum yield was calculated by $$\varphi = \frac{E_s - E_b}{L_b - L_s}$$

where $E_s$ is the integrated fluorescence profile of the sample caused by direct excitation, $E_b$ is the integrated fluorescence profile of an empty integrating sphere (without the sample, only a blank), $L_b$ is the integrated Rayleigh excitation peak of an empty integrating sphere (only a blank), and $L_s$ is the integrated Rayleigh excitation peak of the sample when it is directly excited by the incident beam.

When acquiring the sample and blank fluorescence profiles, the number of accumulated scans was increased from 1 to 20 summed scans on account of the weak emission in comparison to the strong Rayleigh scattering. This factor of 20 was accounted for in the calculation of the quantum yield by dividing ($E_s$-$E_b$) by 20.

TABLE 2

Quantum yields of samples in this study in both aqueous solutions and solid state measured at room temperature.

| | Quantum Yield Φ = (%) | |
|---|---|---|
| | Solution | Solid State |
| 1•Cl | 22.8 ± 0.25 | 4.0 ± 0.01 |
| 2•2Cl | 51.3 ± 0.36 | 0.1 |
| R3•4Cl | 18.3 ± 0.11 | 1.7 ± 0.01 |
| R3 ⊂ CD complex 1:200 | | 25.9 ± 0.04 |
| R4•4Cl | 52.4 ± 0.27 | 7.7 ± 0.01 |
| R4 ⊂ CD complex | | |
| R4:CD = | | |
| 1:5 | | 10.4 ± 0.02 |
| 1:20 | | 12.1 ± 0.02 |
| 1:35 | | 15.7 ± 0.03 |
| 1:50 | | 19.6 ± 0.03 |
| 1:75 | | 25.8 ± 0.03 |
| 1:100 | | 31.0 ± 0.05 |
| 1:150 | | 36.9 ± 0.06 |
| 1:200 | | 45.7 ± 0.08 |
| 1:200 +200 Ad•Cl | | 15.4 ± 0.03 |

Additional Details Regarding Supramolecular Encryption Theory

When mixing inks from each channel in the tri-color inkjet cartridge, the color of the printed dot is dependent to the amount of each ink deposited on the paper surface. In the tri-color inkjet cartridge, the aqueous solutions of the [4]rotaxane R4.4Cl/γ-CD, γ-CD and Ad.Cl were loaded separately into three channels. In an initial experiment, we chose Ad.Cl and AdMe.Cl as non-fluorescent competitors to participate in the supramolecular equilibrium network. Thus, when the competitor is non-fluorescent, the aggregation equilibrium of the [4]rotaxane R4.4Cl in solution or in the solid state can be described using Eq. A.

$$R4 \underset{}{\overset{K_{a1}}{\rightleftharpoons}} R4_2 \underset{}{\overset{K_{a2}}{\rightleftharpoons}} R4_3 \underset{}{\overset{K_{a3}}{\rightleftharpoons}} R4_4 \ldots \underset{}{\overset{K_{a(n-1)}}{\rightleftharpoons}} R4_n \qquad \text{(Eq. A)}$$

If the aggregation of the [4]rotaxane R4.4Cl is homogenous and there is no cooperativity during the nucleation process, the aggregation process can be simplified as:

$$nR4 \underset{}{\overset{n^n K_{agg}^{n-1}}{\rightleftharpoons}} R4_n. \qquad \text{(Eq. B)}$$

Assuming the extents of aggregation in each step are identical, and so:

$$K_{a1}=K_{a2}=K_{a3}=\ldots=K_{a(n-1)}.$$

The process can be simplified as:

$$2R4 \underset{}{\overset{4K_{agg}}{\rightleftharpoons}} R4_2. \qquad \text{(Eq. C)}$$

The aggregation constant $$K_{agg} = \frac{[R4_2]}{4[R4]^2}.$$

Adding γ-CD to the [4]rotaxane R4.4Cl affords a stepwise binding event, where the γ-CD and R4.4Cl forms 1:1 and 2:1 complexes sequentially.

$$R4 + CD \underset{}{\overset{K_1}{\rightleftharpoons}} R4 \subset CD + CD \underset{}{\overset{K_2}{\rightleftharpoons}} R4 \subset CD_2 \qquad \text{(Eq. D)}$$

or $$R4 + 2CD \underset{}{\overset{K_{CD}}{\rightleftharpoons}} R4 \subset CD_2 \qquad \text{(Eq. E)}$$

where $$K_{CD}=K_1 \cdot K_2$$

Upon the addition of Ad.Cl or AdMe.Cl, the encapsulation of the competitor by γ-CD can be described as:

$$CA + CD \underset{}{\overset{K_2}{\rightleftharpoons}} CA \subset CD_2 \qquad \text{(Eq. F)}$$

and the binding constant $$K_3 = \frac{[CA \subset CD]}{[CA] \cdot [CD]}.$$

At any particular wavelength, the fluorescent emission F can be described as:

$$F = F_{R4} + F_{R4 \subset CD} + F_{R4 \subset CD_2} + F_{R4_2} + F_{CA} + F_{CD} + F_{CA \subset CD}. \qquad \text{(Eq. G)}$$

The overall fluorescence color of the printed dot is the integration of the fluorescence emission in the visible spectrum $\int_{209\ nm}^{700\ nm} F$.

If the competitor is not fluorescent, fluorescent emission of the printed dot at a particular wavelength is given by:

$$F = F_{R4} + F_{R4 \subset CD} + F_{R4 \subset CD_2} + F_{R4_2}. \qquad \text{(Eq. H)}$$

Substituting leads to:

$$I_\lambda = F_{R4}^o[R4] + F_{R4_2}^o[R4_2] + F_{R4 \subset CD}^o[R4 \subset CD] + F_{R4 \subset CD_2}^o[R4 \subset CD_2] \qquad \text{(Eq. 1)}$$

In Eq. I, $F_{R4}^o$, $F_{R4_2}^o$, $F_{R4 \subset CD}^o$, and $F_{R4 \subset CD_2}^o$ are the molar emissions of each species.

Using Eq. A-I, $$I_\lambda = (F_{R4}^o[R4] + F_{R4 \subset CD}^o \cdot K_{CD}[CD] + F_{R4 \subset CD_2}^o \cdot K_{CD} \cdot [CD]^2) \cdot [R4] + F_{R4_2}^o \cdot 4K_{agg} \cdot [R4]^2$$

The sum of Eq. D-F affords the overall equilibrium network as:

$$3R4 + 3CD + CA \underset{}{\overset{4K_{agg} \cdot K_{CD} \cdot K_3}{\rightleftharpoons}} R4_2 + R4 \subset CD_2 + CA \subset CD. \qquad \text{(Eq. K)}$$

Assuming m of Ad has been consumed in the reaction, then:

$$4K_{agg} \cdot K_{CD} \cdot K_3 = \frac{m^3}{([R4]_0 - 3m)^3([CD]_0 - 3m)^3([CA]_0 - m)},$$

since $[R4]=[R4]_0-3$ m, $[CD]=[CD]_0-3M$

Thus, the fluorescent emission of the printed dot:

$$I_\lambda = F_{R4}^o + F_{R4 \subset CD}^o \cdot \sqrt{K_{CD}}([CD]_0 - 3m) + F_{R4 \subset CD_2}^o \cdot K_{CD} \cdot ([CD]_0 - 3m)^2 \cdot ([R4]_0 - 3m) + F_{R4_2}^o \cdot 4K_{agg} \cdot ([R4]_0 - 3m)^2$$

If the competitor is fluorescent, then the fluorescence emission of the printed dot at certain wavelength can be described as:

$$I_\lambda = F_{R4}^{\ o} \cdot [R4] + F_{R4_2}^{\ o} \cdot [R4_2] + F_{R4 \subset CD}^{\ o} \cdot [R4 \subset CD] + F_{R4 \subset CD_2}^{\ o} \cdot [R4 \subset CD_2] + F_{CA}^{\ o} \cdot [CA] + F_{CA \subset CD}^{\ o} \cdot [CA \subset CD]$$

$$I_\lambda = F_{R4}^{\ o} + F_{R4 \subset CD}^{\ o} \cdot \sqrt{K_{CD}} ([CD]_0 - 3m) + F_{R4 \subset CD_2}^{\ o} \cdot K_{CD} \cdot ([CD]_0 - 3m)^2 \cdot ([R4]_0 - 3m) + F_{R4_2}^{\ o} \cdot 4K_{agg} \cdot ([R4]_0 - 3m)^2 + F_{CA}^{\ o} \cdot ([CA]_0 - m) + F_{CA \subset CD}^{\ o} \cdot m$$

Ink Writing Tests

Four type of inks for pen writing were prepared using R4.4Cl (0.5 mM), Ad.Cl (100 mM), γ-CD (100 mM) and R4⊂γ-CD$_2$ (R4.4Cl=0.5 mM, γ-CD=100 mM) solutions, respectively. Typically, 0.5 mL of the ink was loaded into a fountain pen for writing tests. A wide selection of paper-based printing media were tested, including copy papers (variety brands and models), matte presentation paper (HP), glossy presentation paper (HP), resume papers (25 and 100% cotton), newsprint papers, rag paper (100% cotton, without optical brightener), cardboard, and cigarette rolling paper. Banknote identification tests were performed on genuine or counterfeit banknotes of US Dollars, British Pounds Sterling, Euros, Chinese Yuan and Japanese Yen. In these tests, the corresponding currency symbols ($, £, €, and ¥) were drawn on the banknotes using the fountain pen filled with R4⊂γ-CD$_2$ ink. The color of the symbols on fake banknotes quickly changed from green to orange under the UV LED light, while the symbols on genuine banknotes retained their green color. To simulate fake banknotes, images of the different banknotes were downloaded from the world wide web. One side of the fake banknotes was printed on different copy papers at 200% of its original size for use in the writing tests, after which the fake notes were destroyed.

The paper used in the writing test can generally be divided into two categories: 1) paper with optical brightener; and 2) paper without optical brightener. Optical brighteners have been widely used in the paper industry to make papers look whiter under natural light. These optical brighteners are fluorescent materials which usually absorb light in the UV region (340-370 nm) and emit blue fluorescence at around 420-470 nm. Optical brightener can interfere with the ink performance by reducing the contrast level. The widely used optical brightener includes stilbene derivatives, coumarins, imidazolines, etc. Many of the optical brighteners used in the paper industry can be encapsulated by γ-CD, resulting in a fluorescent color change after writing.

TABLE 3

Summary of writing tests using R4⊂γ-CD$_2$ ink on different media.

| Writing media | Fluorescent color under UV light |
| --- | --- |
| Copy paper (75 g/m$^2$, Office Depot) | Orange |
| Copy paper (75 g/m$^2$, Xerox) | Orange |
| Copy paper (80 g/m$^2$, HP) | Orange |
| Matte inkjet print paper (120 g/m$^2$, HP) | Orange |
| Glossy inkjet print paper (120 g/m$^2$, HP) | Orange |
| Newsprint paper (40 g/m$^2$) | Green |
| Rag paper (220 g/m$^2$, coated side) | Orange |
| Rag paper (220 g/m$^2$, uncoated side) | Green |
| Rag paper (320 g/m$^2$, coated side) | Orange |
| Rag paper (320 g/m$^2$, uncoated side) | Green |
| Filter paper (Whatman) | Green |
| Cigarette rolling paper | Green |
| Inkjet Photopaper (HP) | Green |

As shown in Table 3, R4⊂γ-CD$_2$ ink is very sensitive to the paper media. Papers made of cellulose (rag paper and filter paper) as well as those made of plant fibers (newsprint and cigarette rolling paper) do not seem to interact with the R4⊂γ-CD$_2$ complex. Most of the daily-use copy papers contain a large number of additives, which include optical brightener, sizing agents, wet strength additive, dry strength additive, coating agents, etc. It is practically difficult to elucidate which additive(s) interacts with γ-CD, but this phenomenon was observed consistently in all our writing tests. In addition, rag paper with a coated surface was able to interact with γ-CD in the R4⊂γ-CD$_2$ ink, resulting in a fluorescence color change under UV light.

Ink Printing Tests

Printing tests were performed on a HP inkjet printer (Photosmart CP4780 model) with customized ink cartridges. Rag papers (Canson Infinity Rag Photographique, 100% cotton, without optical brightener, no surface-coating side) were used for the printing tests based on the ink writing tests.

Ink cartridges for printing test were customized from the HP black and tri-color cartridges (HP60 model). The filled inks were removed from the cartridge and washed extensively with H$_2$O and EtOH. The aqueous solutions of R4.4Cl (4 mL, 0.25 mM) and R4⊂γ-CD$_2$ (4 mL, R4.4Cl=0.25 mM, γ-CD=50 mM) were loaded into two cleaned black ink cartridges, respectively, to perform the monochrome printing tests. In the polychrome printing tests, the aqueous solutions of Ad.Cl (2 mL, 100 mM), R4/γ-CD (2 mL, R4.4Cl=0.25 mM, γ-CD=10 mM) and γ-CD (2 mL, 50 mM) were loaded into the magenta, yellow, and cyan channels of the cleaned tri-color ink cartridge, respectively. Fluorescent color under UV light was tuned by controlling the proportion of three inks in the customized tri-color ink cartridge. In order to index the colors from a digital input file for printing with the desired fluorescent ink colors, two color palettes were printed using the original tri-color ink-cartridges and the customized ink cartridges. Translating the fluorescent ink colors to the correspondent visible color in the standard color palette in the digital input file accurately reproduced the desired fluorescent ink colors in the printed documents.

RGB (Red-Green-Blue) Printing

Figure 5B:
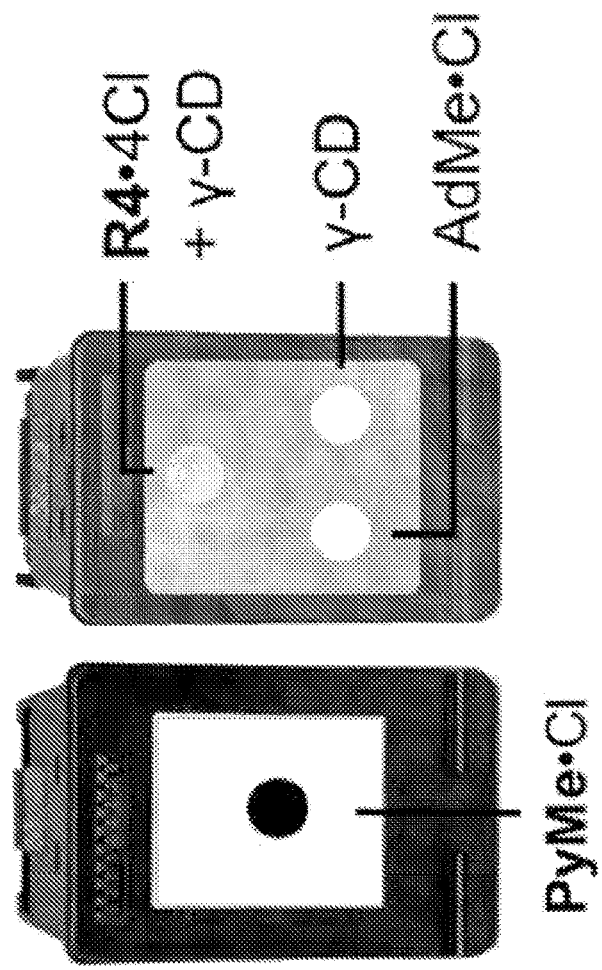
FIG. 5B. A combination use of black inkjet cartridge loaded with the aqueous solution of PyMe.Cl (1 mM) and tri-color inkjet cartridge with R4.4Cl/γ-CD (2 mL, R4.4Cl: 0.25 mM, γ-CD: 10 mM),AdMe.Cl (2 mL, 50 mM), and γ-CD (2 mL, γ-CD: 25 mM), in three channels respectively.
Figure 5A:
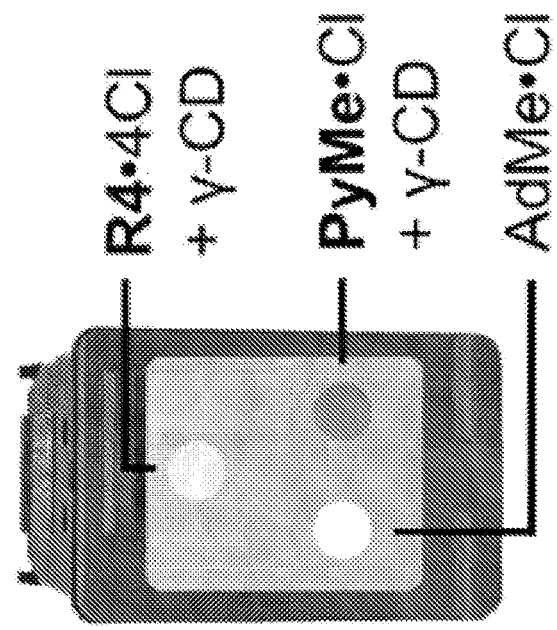
FIGS. 5A and B. RGB printing inkjet printer cartridges setup.

In order to perform RGB printing, PyMe.Cl was selected to provide blue fluorescent emission upon UV irradiation. There are two ways to provide RGB printing, as shown in FIGS. 5A and 5B.

In practice, both of the settings could provide a wide spectrum of colors, ranging from purple to red fluorescence upon UV irradiation. The color distributions of the printed images were very different, however, by using these two types of RBG printing settings.

Authentication Experiments

Theory: Anti-counterfeiting technology and counterfeiting is a continuous battle. The [4]rotaxane-based security ink provides several 'keys' to encrypt the printed image by means of polychromic printing. By employing these keys, which are (i) the initial concentrations of inks, (ii) the binding constants, and (iii) the choice of competitor reagents, one can easily manipulate (iv) the fluorescent color distribution, (v) the color spectrum width and (vi) the color intensity of the output file. These security features embody the first level security of the [4]rotaxane-based security ink.

Benefiting from the rich properties of the [4]rotaxane, we can further add another level of security through a post-printing authentication process. Post-printing a layer of authentication reagent on top of a printed polychromic image results in further color changes. Even if a counterfeiter could reverse-engineer to match the fluorescence color of the original printed polychromic image, reproducing a color-change process of the polychromic fluorescent image is nigh impossible. Firstly, the color changing process is dynamic—depending on the amount of authentication reagents applied—i.e., printed or sprayed onto the image—the final color distribution will be different. Secondly, there are more than 10 post-print authentication reagents that can be applied to give fingerprint-like color changes. They can be used either individually or combined together to verify the suspect product. This method, therefore, creates a large number of color changing combinations, which can be used to verify the authenticity of the document.

Methods. Aqueous solutions of post-printing reagents were loaded into empty black inkjet cartridges and test rag paper with a previously printed color palette was loaded into the paper tray of an inkjet printer. A homogenous layer of the ink was printed across the sheet of rag paper in order to coat the color palette. Images were taken under UV light ($\lambda$=254) in a dark room.

Strategies. Post-print authentication can be carried out using four different strategies, namely, (i) fluorescent color changing using authentication reagents that are themselves non-fluorescent, (ii) the introduction of new colors using fluorescent authentication reagents, (iii) addition of counterion exchange reagents, and (iv) washing with water.

(i) Fluorescent color change using non-fluorescent authentication reagents. Post-printing solutions of binding reagents (e.g., $\gamma$-CD) or competitors (Ad.Cl, AdMe.Cl, etc.) on top of images results in a characteristic color change. For example, post-printing a $\gamma$-CD solution on top of an existing multi-chromic print will cause hypsochromic shifts in the fluorescence emission colors of areas that were initially red, towards more green emission, without affecting colors that were initially green or blue. Post-printing AdMe.Cl solution will affect several color regions. The solutions of the authentication reagents are transparent and visibly undistinguishable from one another. When performing the authentication test, a consumer could easily use a spray bottle (for example, the bottles used to dispense perfumes) to spray the authentication reagents on top of the printed information and verify the color change.

(ii) Fluorescent color change by printing fluorescent authentication reagents. Instead of using non-fluorescent compounds to perform the authentication test, many water soluble fluorescent dyes can also be used to verify the authentication of a given document. These fluorescent dyes not only act as a competitor to shift the supramolecular equilibrium, but they also contribute to the color intensity and color spectrum width.

(iii) Fluorescent color changing by counterion exchanging reagents. Exchanging the chloride counterions of the [4]rotaxane by the addition of fluorescent or non-fluorescent salts changes the solid-state fluorescence of the printed image. Unlike strategies (i) and (ii), after the counterion exchange process, the [4]rotaxane ink is nearly insoluble in water, thus fixing the color change.

(iv) Fluorescent color changing by water washing. The simplest way to assess the authenticity of a printed image is by rinsing with water. Both the binding reagents (e.g. $\gamma$-CD) and the competitors (Ad.Cl, AdMe.Cl, etc.) are water soluble, so can be removed easily by washing. Surprisingly, although the [4]rotaxane ink is water soluble when first prepared, it stains paper media very strongly and is resistant to aqueous washing. After soaking the printed documents in water over 24 h, most of the fluorescent color is lost, but the orange emission from [4]rotaxane still remains.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

REFERENCES

1. Frontier Economics, (International Chamber of Commerce, www.iccwbo.org/Data/Documents/Bascap/Global-Impacts-Study-Full-Report/, 2011).
2. P. Aldhous, Counterfeit pharmaceuticals: murder by medicine. *Nature* 434, 132-136 (2005).
3. E. L. Prime, D. H. Solomon, Australia's plastic banknotes: fighting counterfeit currency. *Angew. Chem. Int. Ed.* 49, 3726-3736 (2010).
4. A. K. Deisingh, Pharmaceutical counterfeiting. *Analyst* 130, 271-279 (2005).
5. B. Yoon et al., Recent functional material based approaches to prevent and detect counterfeiting. *J. Mater. Chem. C* 1, 2388-2403 (2013).
6. J. Reichelsheimer, B. Haas, Multiple color fluorescence security imprint. Patent US20100143578 (2010).
7. X. Zhang, S. Rehm, M. M. Safont-Sempere, F. Wurthner, Vesicular perylene dye nanocapsules as supramolecular fluorescent pH sensor systems. *Nat. Chem.* 1, 623-629 (2009).
8. J. M. Meruga et al., Red-green-blue printing using luminescence-up conversion inks. *J. Mater. Chem. C* 2, 2221-2227 (2014).
9. Y. Q. Lu et al., Tunable lifetime multiplexing using luminescent nanocrystals. *Nat. Photonics* 8, 33-37 (2014).
10. T. Mutai, H. Satou, K. Araki, Reproducible on-off switching of solid-state luminescence by controlling molecular packing through heat-mode interconversion. *Nat. Mater.* 4, 685-687 (2005).
11. Y. Sagara, T. Kato, Mechanically induced luminescence changes in molecular assemblies. *Nat. Chem.* 1, 605-610 (2009).
12. G. Q. Zhang, G. M. Palmer, M. Dewhirst, C. L. Fraser, A dual-emissive-materials design concept enables tumour hypoxia imaging. *Nat. Mater.* 8, 747-751 (2009).
13. G. Q. Zhang, J. W. Lu, M. Sabat, C. L. Fraser, Polymorphism and reversible mechanochromic luminescence for solid-state difluoroboron avobenzone. *J. Am. Chem. Soc.* 132, 2160-2162 (2010).
14. Y. Sagara, T. Kato, Brightly tricolored mechanochromic luminescence from a single-luminophore liquid crystal: reversible writing and erasing of images. *Angew. Chem. Int. Ed.* 50, 9128-9132 (2011).
15. Y. Dong et al., Piezochromic luminescence based on the molecular aggregation of 9,10-bis((E)-2-(pyrid-2-yl)vinyl)anthracene. *Angew. Chem. Int. Ed.* 51, 10782-10785 (2012).

16. C. Ke et al., Quantitative emergence of hetero[4]rotaxanes by template-directed click chemistry. *Angew. Chem. Int. Ed.* 52, 381-387 (2013).
17. C. Ke et al., Pillar[5]arene as a co-factor in templating rotaxane formation. *J. Am. Chem. Soc.* 135, 17019-17030 (2013).
18. A. Slamaschwok et al., Interactions of the dimethyldiazaperopyrenium dication with nucleic-acids .1. binding to nucleic-acid components and to single-stranded polynucleotides and photocleavage of single-stranded oligonucleotides. *Biochemistry* 28, 3227-3234 (1989).
19. F. Biedermann et al., Strongly fluorescent, switchable perylene bis(diimide) host-guest complexes with cucurbit[8]uril in water. *Angew. Chem. Int. Ed.* 51, 7739-7743 (2012).
20. F. Cacialli et al., Cyclodextrin-threaded conjugated polyrotaxanes as insulated molecular wires with reduced interstrand interactions. *Nat. Mater.* 1, 160-164 (2002).
21. C. A. Hunter, H. L. Anderson, What is cooperativity? *Angew. Chem. Int. Ed.* 48, 7488-7499 (2009).
22. F. Fennel et al., Biphasic self-assembly pathways and size-dependent photophysical properties of perylene bisimide dye aggregates. *J. Am. Chem. Soc.* 135, 18722-18725 (2013).
23. T. Forster, Zwischenmolekulare energiewanderung und fluoreszenz. *Ann. Phys. (Berlin)* 2, 55-75 (1948).
24. M. Kajtar, C. Horvathtoro, E. Kuthi, J. Szejtli, A simple rule for predicting circular-dichroism induced in aromatic guests by cyclodextrin hosts in inclusion complexes. *Acta. Chim. Acad. Sci. Hung.* 110, 327-355 (1982).
25. M. Kodaka, A general rule for circular-dichroism induced by a chiral macrocycle. *J. Am. Chem. Soc.* 115, 3702-3705 (1993).
27. The neutral form of compound S3 has been reported: A. Okamoto, K. Kanatani, I. Saito, Pyrene-labeled base-discriminating fluorescent DNA probes for homogeneous SNP typing. *J. Am. Chem. Soc.* 126, 4820-4827 (2004).
28. M. Takahashi, Y. Suzuki, Y. Ichihashi, M. Yamashita, H. Kawai, 1,3,8,10-Tetrahydro-2,9-diazadibenzo[cd,lm]perylenes: synthesis of reduced perylene bisimide analogues. *Tetrahedron Lett.* 48, 357-359 (2007).
29. S. Angelos, Y.-W. Yang, K. Patel, J. F. Stoddart, J. F. Zink, pH-Responsive supramolecular nanovalves based on cucurbit[6]uril pseudorotaxanes. *Angew. Chem. Int. Ed.* 47, 2222-2226 (2008).
30. A. N. Basuray et al., The chameleonic nature of diazaperopyrenium recognition processes. *Angew. Chem. Int. Ed.* 51, 17436-17439 (2012).

What is claimed is:

1. A fluorescent ink composition comprising:
    (a) a heterorotaxane comprising:
        (i) a substantially linear molecule comprising a central fluorophoric group, a first fluorophoric end group on one end of the substantially linear molecule, and a second fluorophoric end group on the opposite end of the substantially linear molecule;
        (ii) a first macrocyclic ring encircling the central fluorophoric group;
        (iii) a second macrocyclic ring encircling a portion of the substantially linear molecule between the first fluorophoric end group and the central fluorophoric group; and
        (iv) a third macrocyclic ring encircling a portion of the substantially linear molecule between the second fluorophoric end group and the central fluorophoric group; and
    (b) an encapsulating agent comprising a macrocyclic ring encapsulating one or both of the first and second fluorophoric end groups.

2. The composition of claim 1, further comprising: (c) a competitive binding agent that competes with one or both of the first and second fluorophoric end groups for binding the encapsulating agent.

3. The composition of claim 1, wherein the heterorotaxane has the structure:

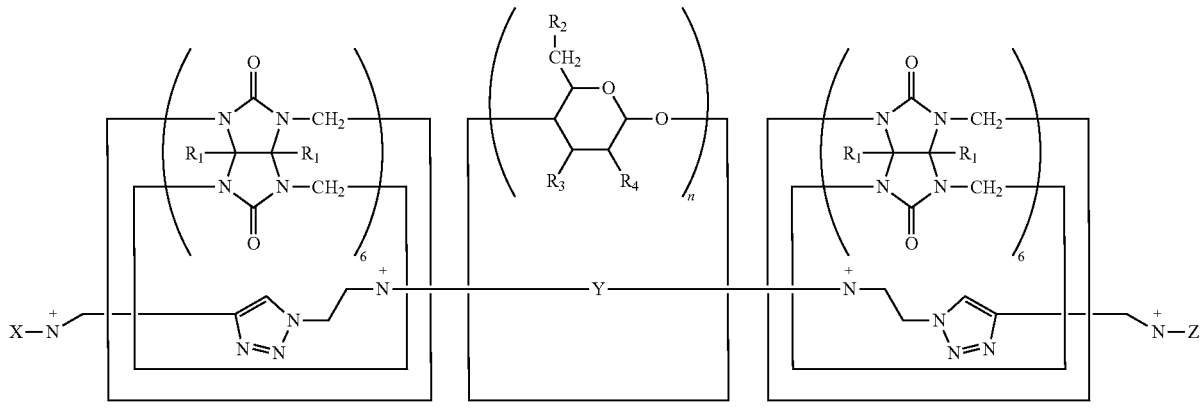

where X is the first fluorophoric end group, Y is the central fluorophoric group and Z is the second fluorophoric end group; $N^+$ is a quarternary nitrogen cation; n is selected from 6, 7 and 8; $R_1$, $R_2$, $R_3$ and $R_4$ are selected independently from the group consisting of H, alkyl groups, alkenyl groups, alkynyl groups, aryl groups, OH, $NH_2$, SH, F, Cl, Br, I, $PR'_2$, CHO, COOR', COOM, $CH_2OR'$, $CH_2OM$, OR', NHCOR', CONHR', CONHM, $CONR'_2$, $N_3$, $NO_2$, $B(OR')_2$, $B(OM)_2$, CN, $NR'^{3+}$, $PR'^{3+}$, $POR'_2$, and OM, where R' is selected independently from the group consisting of H, alkyl groups, alkenyl groups, alkynyl groups, and aryl groups and M is selected independently from the group consisting of Li, Na, K, Rb, and Cs; and $C^-$ is an organic or inorganic negatively charged ion.

4. The composition of claim 2, wherein the heterorotaxane has the structure:

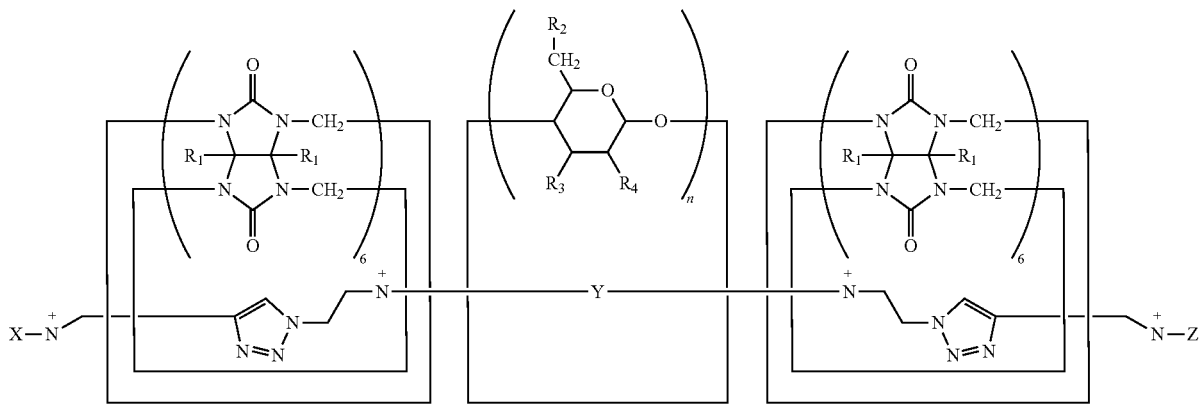

where X is the first fluorophoric end group, Y is the central fluorophoric group and Z is the second fluorophoric end group; $N^+$ is a quarternary nitrogen cation; n is selected from 6, 7 and 8; $R_1$, $R_2$, $R_3$ and $R_4$ are selected independently from the group consisting of H, alkyl groups, alkenyl groups, alkynyl groups, aryl groups, OH, $NH_2$, SH, F, Cl, Br, I, $PR'_2$, CHO, COOR', COOM, $CH_2OR'$, $CH_2OM$, OR', NHCOR', CONHR', CONHM, $CONR'_2$, $N_3$, $NO_2$, $B(OR')_2$, $B(OM)_2$, CN, $NR'^{3+}$, $PR'^{3+}$, $POR'_2$, and OM, where R' is selected independently from the group consisting of H, alkyl groups, alkenyl groups, alkynyl groups, and aryl groups and M is selected independently from the group consisting of Li, Na, K, Rb, and Cs; and $C^-$ is an organic or inorganic negatively charged ion.

5. The composition of claim 4, wherein where X, Y and Z are selected from the group consisting of pyrene, anthracene, coumarin, acridine, 9-aminoacridine, fluorescein, naphthofluorescein, resofurin, rhodamine B, rhodamine 6G, perylene diimide, naphthalene diimide, propidium, boron difluoride dipyrromethene, phthalocyanine, cyanine, porphyrin, biphenyl, a group having the structure:

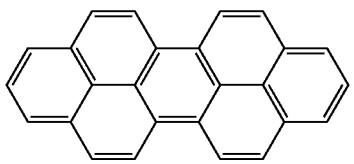 [SMILES: c1cc2ccc3c4ccc5cccc6ccc(c7ccc(c1)c2c37)c4c56]

$N^+$ is selected from the group consisting of $NH_2^+$, ammonium cations, methyl ammonium cations, dimethyl ammonium and pyridinium cations; and $C^-$ is selected from the group consisting of $F^-$, $Cl^-$, $Br^-$, $I^-$, $PF_6^-$, $BF_4^-$, $CF_3COO^-$, $CH_3COO^-$, $SO_4^{2-}$, $SO_3^{2-}$, $NO_3^-$, $NO_2^-$, $CO_3^{2-}$, $HCO_3^-$, $ClO_4^-$, $PO_4^{3-}$, $HPO_4^{2-}$, $H_2PO_4^-$, $CN^-$, and $SCN^-$.

6. The composition of claim 4, wherein X and Z are 1-pyrenylmethyl and Y has the structure

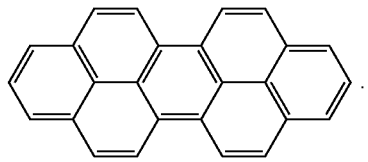 [SMILES: c1cc2ccc3c4ccc5cccc6ccc(c7ccc(c1)c2c37)c4c56]

7. The composition of claim 1, wherein the encapsulating agent comprises a γ-cyclodextrin.

8. The composition of claim 2, wherein the encapsulating agent comprises a γ-cyclodextrin.

9. The composition of claim 8, wherein the competitive binding agent comprises 2-adamantylamine hydrochloride.

* * * * *